(12) United States Patent
Muller

(10) Patent No.: US 10,943,706 B2
(45) Date of Patent: Mar. 9, 2021

(54) HAZARDOUS MATERIAL CANISTER SYSTEMS AND METHODS

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

(*) Notice: Subject to any disclaimer, the term of this patent is extended or adjusted under 35 U.S.C. 154(b) by 0 days.

(21) Appl. No.: 16/796,784

(22) Filed: Feb. 20, 2020

(65) Prior Publication Data
US 2020/0357532 A1 Nov. 12, 2020

Related U.S. Application Data

(60) Provisional application No. 62/808,594, filed on Feb. 21, 2019, provisional application No. 62/808,516, (Continued)

(51) Int. Cl.
*G21F 5/005* (2006.01)
*G21F 5/12* (2006.01)
(Continued)

(52) U.S. Cl.
CPC .............. *G21F 5/125* (2019.01); *G21F 5/008* (2013.01); *G01M 3/38* (2013.01); *G01N 23/10* (2013.01)

(58) Field of Classification Search
CPC ........ G21F 5/00–008; G21F 5/06; G21F 5/12; G21F 5/125; G01M 3/00; G01M 3/38; G01N 23/10
See application file for complete search history.

(56) References Cited

U.S. PATENT DOCUMENTS

| 3,711,715 A | 1/1973 | Bochard |
| 3,780,309 A | 12/1973 | Bochard |

(Continued)

FOREIGN PATENT DOCUMENTS

| CN | 104569006 | 4/2015 |
| EP | 2555203 | 2/2013 |

(Continued)

OTHER PUBLICATIONS

[No Author] World Nuclear News, "Yucca Mountain cost estimate rises to $96 billion", Aug. 6, 2008, 2 pages, ISSN 2040-5766.

(Continued)

*Primary Examiner* — Nguyen Q. Ha
(74) *Attorney, Agent, or Firm* — Fish & Richardson P.C.

(57) ABSTRACT

Techniques for inspecting a weld of a nuclear waste canister include positioning a gamma ray image detector near a nuclear waste canister that encloses nuclear waste. The nuclear waste canister includes a housing that includes a volume in which the waste is enclosed and a top connected to the housing with at least one weld to seal the nuclear waste in the nuclear waste canister. The techniques further include receiving, at the gamma ray image detector, gamma rays from the nuclear waste that travel through one or more voids in the weld; generating an image of the received gamma rays with the gamma ray image detector; and based on the generated image, determining an integrity of the at least one weld.

24 Claims, 10 Drawing Sheets

Related U.S. Application Data filed on Feb. 21, 2019, provisional application No. 62/808,591, filed on Feb. 21, 2019, provisional application No. 62/808,570, filed on Feb. 21, 2019, provisional application No. 62/808,571, filed on Feb. 21, 2019, provisional application No. 62/808,745, filed on Feb. 21, 2019.

(51) Int. Cl.
*G21F 5/008* (2006.01)
*G01M 3/38* (2006.01)
*G01N 23/10* (2018.01)

(56) References Cited

U.S. PATENT DOCUMENTS

| | | | | |
|---|---|---|---|---|
| 3,835,324 | A * | 9/1974 | Weigle | G01N 23/18 378/59 |
| 3,902,548 | A | 9/1975 | Bochard | |
| 3,930,166 | A | 12/1975 | Bochard | |
| 3,948,575 | A | 4/1976 | Rosser | |
| 4,274,007 | A | 6/1981 | Baatz et al. | |
| 4,320,028 | A | 3/1982 | Leuchtag | |
| 4,337,167 | A | 6/1982 | Bird et al. | |
| 4,516,256 | A * | 5/1985 | Wapperom | G21F 5/02 250/497.1 |
| 4,554,128 | A * | 11/1985 | Parker | G21C 17/06 376/252 |
| 5,137,166 | A * | 8/1992 | Unger | B29C 66/112 220/613 |
| 5,165,235 | A | 11/1992 | Nitschke | |
| 5,187,728 | A * | 2/1993 | Vaughn | G01N 23/18 378/59 |
| 5,199,488 | A | 4/1993 | Kasevich et al. | |
| 5,314,264 | A | 5/1994 | Danko et al. | |
| 5,340,235 | A | 8/1994 | Milliken | |
| 5,377,104 | A | 12/1994 | Sorrells et al. | |
| 5,387,741 | A | 2/1995 | Shuttle | |
| 5,391,887 | A * | 2/1995 | Murray, Jr. | G21F 5/12 250/506.1 |
| 5,615,794 | A * | 4/1997 | Murray, Jr. | G21F 5/12 220/304 |
| 5,786,611 | A | 7/1998 | Quapp et al. | |
| 5,835,548 | A | 10/1998 | Lindgren et al. | |
| 5,832,392 | A | 11/1998 | Forsberg | |
| 5,850,614 | A | 12/1998 | Crichlow | |
| 5,863,283 | A | 1/1999 | Gardes | |
| 6,114,710 | A | 9/2000 | Contrepois et al. | |
| 6,137,860 | A * | 10/2000 | Ellegood | B24B 7/005 228/104 |
| 6,238,138 | B1 | 5/2001 | Crichlow | |
| 6,366,633 | B1 | 4/2002 | Stezaly et al. | |
| 6,372,157 | B1 | 4/2002 | Krill et al. | |
| 6,553,094 | B1 | 4/2003 | Bernardi et al. | |
| 6,727,510 | B2 * | 4/2004 | Matsunaga | G21F 5/12 105/358 |
| 6,784,443 | B2 | 8/2004 | Pennington et al. | |
| 6,853,697 | B2 | 2/2005 | Singh et al. | |
| 6,889,108 | B2 | 5/2005 | Tanaka et al. | |
| 6,925,138 | B2 | 8/2005 | Nakamaru et al. | |
| 7,068,748 | B2 | 6/2006 | Singh | |
| 7,287,934 | B2 | 10/2007 | Okutsu et al. | |
| 7,330,526 | B2 | 2/2008 | Singh | |
| 7,590,213 | B1 | 9/2009 | Singh | |
| 7,781,637 | B2 | 8/2010 | Russell et al. | |
| 7,786,456 | B2 | 8/2010 | Singh et al. | |
| 7,933,374 | B2 | 4/2011 | Singh | |
| 8,003,966 | B2 | 8/2011 | Temus et al. | |
| 8,098,790 | B2 | 1/2012 | Singh | |
| 8,135,107 | B2 | 3/2012 | Singh et al. | |
| 8,342,357 | B1 | 1/2013 | Grubb et al. | |
| 8,351,562 | B2 | 1/2013 | Singh | |
| 8,437,444 | B2 | 5/2013 | Pennington et al. | |
| 8,561,318 | B2 | 10/2013 | Singh et al. | |
| 8,576,976 | B2 | 11/2013 | Singh et al. | |
| 8,625,732 | B2 | 1/2014 | Singh | |
| 8,630,384 | B2 | 1/2014 | Carver et al. | |
| 8,657,549 | B2 | 2/2014 | Grubb et al. | |
| 8,737,559 | B2 | 5/2014 | Singh | |
| 8,798,224 | B2 | 8/2014 | Singh | |
| 8,923,478 | B2 * | 12/2014 | Knight | G01N 23/083 378/60 |
| 8,929,504 | B2 | 1/2015 | Singh et al. | |
| 8,933,289 | B2 | 1/2015 | Crichlow | |
| 9,349,493 | B2 | 5/2016 | Bracey et al. | |
| 9,396,824 | B2 | 7/2016 | Agace | |
| 9,442,037 | B2 | 9/2016 | Agace | |
| 9,443,625 | B2 | 9/2016 | Singh | |
| 9,514,853 | B2 | 12/2016 | Singh et al. | |
| 9,558,857 | B2 | 1/2017 | Subiry | |
| 9,640,289 | B2 | 5/2017 | Springman et al. | |
| 9,672,948 | B2 | 6/2017 | Singh | |
| 9,724,790 | B2 | 8/2017 | Grubb et al. | |
| 9,748,009 | B2 | 8/2017 | Singh | |
| 9,761,338 | B2 | 9/2017 | Singh | |
| 9,779,843 | B2 | 10/2017 | Singh et al. | |
| 9,831,005 | B2 | 11/2017 | Singh | |
| 9,833,819 | B2 | 12/2017 | Burget | |
| 9,852,822 | B2 | 12/2017 | Singh | |
| 9,916,911 | B2 | 3/2018 | Singh | |
| 10,002,683 | B2 | 6/2018 | Muller et al. | |
| 10,008,299 | B2 | 6/2018 | Wellwood et al. | |
| 10,020,084 | B2 | 7/2018 | Lehnert et al. | |
| 10,032,533 | B2 | 7/2018 | Carver et al. | |
| 10,037,826 | B2 | 7/2018 | Singh et al. | |
| 10,049,777 | B2 | 8/2018 | Singh | |
| 10,115,490 | B1 | 10/2018 | Downey | |
| 10,147,509 | B2 | 12/2018 | Singh | |
| 10,217,537 | B2 | 2/2019 | Agace | |
| 10,229,764 | B2 | 3/2019 | Singh et al. | |
| 10,265,743 | B1 | 4/2019 | Muller et al. | |
| 10,297,356 | B2 | 5/2019 | Springman et al. | |
| 10,311,987 | B2 | 6/2019 | Singh et al. | |
| 10,332,642 | B2 | 6/2019 | Singh | |
| 10,373,722 | B2 | 8/2019 | Singh | |
| 10,410,756 | B2 | 9/2019 | Singh | |
| 10,438,710 | B2 | 10/2019 | Subiry | |
| 10,446,287 | B2 | 10/2019 | Singh | |
| 2001/0032851 | A1 | 10/2001 | Pennington et al. | |
| 2002/0020528 | A1 | 2/2002 | McCabe et al. | |
| 2004/0109523 | A1 | 6/2004 | Singh et al. | |
| 2005/0117687 | A1 | 6/2005 | Carver et al. | |
| 2005/0207525 | A1 | 9/2005 | Singh | |
| 2005/0220257 | A1 | 10/2005 | Singh | |
| 2006/0056566 | A1 * | 3/2006 | Vandergheynst | G21C 17/06 376/245 |
| 2006/0215803 | A1 | 9/2006 | Singh | |
| 2008/0069291 | A1 | 3/2008 | Singh et al. | |
| 2008/0073601 | A1 | 3/2008 | Temus et al. | |
| 2009/0158614 | A1 | 6/2009 | Singh et al. | |
| 2009/0159550 | A1 | 6/2009 | Singh et al. | |
| 2009/0252274 | A1 | 10/2009 | Singh | |
| 2010/0105975 | A1 | 4/2010 | Baird | |
| 2010/0254785 | A1 | 10/2010 | Grubb et al. | |
| 2010/0272225 | A1 | 10/2010 | Singh | |
| 2010/0284506 | A1 | 11/2010 | Singh | |
| 2011/0005762 | A1 | 1/2011 | Poole | |
| 2011/0021859 | A1 | 1/2011 | Singh | |
| 2011/0255647 | A1 | 10/2011 | Singh | |
| 2012/0083644 | A1 | 4/2012 | Singh | |
| 2013/0070885 | A1 | 3/2013 | Singh et al. | |
| 2013/0112408 | A1 | 5/2013 | Oxtoby | |
| 2013/0163710 | A1 | 6/2013 | Singh | |
| 2013/0322589 | A1 | 12/2013 | Bracey et al. | |
| 2013/0340225 | A1 | 12/2013 | Grubb et al. | |
| 2014/0039235 | A1 | 2/2014 | Subiry | |
| 2014/0047733 | A1 | 2/2014 | Singh et al. | |
| 2014/0177776 | A1 | 6/2014 | Singh | |
| 2014/0192946 | A1 | 7/2014 | Singh | |
| 2014/0219408 | A1 | 8/2014 | Singh | |
| 2014/0270043 | A1 | 9/2014 | Lehnert et al. | |
| 2014/0317952 | A1 | 10/2014 | Singh | |
| 2014/0329455 | A1 | 11/2014 | Singh | |

(56) References Cited

U.S. PATENT DOCUMENTS

| | | |
|---|---|---|
| 2014/0341330 A1 | 11/2014 | Singh |
| 2015/0069274 A1 | 3/2015 | Agace |
| 2015/0071398 A1 | 3/2015 | Singh |
| 2015/0092904 A1 | 4/2015 | Carver et al. |
| 2015/0211954 A1 | 7/2015 | Agace |
| 2015/0340112 A1 | 11/2015 | Singh et al. |
| 2015/0357066 A1 | 12/2015 | Singh |
| 2016/0027538 A1 | 1/2016 | Singh et al. |
| 2016/0118152 A1 | 4/2016 | Singh et al. |
| 2016/0163404 A9 | 6/2016 | Singh |
| 2016/0196887 A1 | 7/2016 | Singh et al. |
| 2016/0203884 A1 | 7/2016 | Springman et al. |
| 2016/0365163 A1 | 12/2016 | Singh |
| 2017/0082556 A1 | 3/2017 | Bueno et al. |
| 2017/0110209 A1 | 4/2017 | Subiry |
| 2017/0110210 A1 | 4/2017 | Singh |
| 2017/0236605 A1 | 8/2017 | Springman et al. |
| 2017/0301425 A1 | 10/2017 | Wellwood et al. |
| 2018/0005717 A1 | 1/2018 | Singh et al. |
| 2018/0005718 A1 | 1/2018 | Singh |
| 2018/0025800 A1 | 1/2018 | Singh |
| 2018/0053574 A1 | 2/2018 | Singh |
| 2018/0061515 A1 | 3/2018 | Singh |
| 2018/0144841 A1 | 5/2018 | Singh |
| 2018/0182504 A1 | 6/2018 | Muller et al. |
| 2018/0190401 A1 | 7/2018 | Singh |
| 2018/0277273 A1 | 9/2018 | Singh et al. |
| 2018/0290188 A1 | 10/2018 | Crichlow |
| 2018/0301231 A1 | 10/2018 | Singh et al. |
| 2018/0308594 A1 | 10/2018 | Carver et al. |
| 2018/0322970 A1 | 11/2018 | Singh et al. |
| 2018/0345336 A1 | 12/2018 | Muller et al. |
| 2019/0066858 A1 | 2/2019 | Sisley et al. |
| 2019/0099790 A1 | 4/2019 | Muller et al. |
| 2019/0103197 A1 | 4/2019 | Singh et al. |
| 2019/0131023 A1* | 5/2019 | Littmann ............... G01N 29/07 |
| 2019/0139661 A1 | 5/2019 | Singh |
| 2019/0326028 A1 | 10/2019 | Singh |
| 2019/0348186 A1 | 11/2019 | Singh |
| 2020/0027607 A1 | 1/2020 | Muller et al. |

FOREIGN PATENT DOCUMENTS

| | | | | |
|---|---|---|---|---|
| JP | 07214370 A | * | 8/1995 | ............. B23K 31/00 |
| JP | H09264992 | | 10/1997 | |
| JP | 2004011708 | | 1/2004 | |
| WO | WO 92007667 | | 5/1992 | |
| WO | WO 2015/069300 | | 5/2015 | |
| WO | WO 2016/177876 | | 11/2016 | |

OTHER PUBLICATIONS

Arnold, et al., "Reference Design and Operations of Deep Borehole Disposal of High-Level Radioactive Waste," Sandia National Laboratories (2011) ("Sandia Report") (available at: http://prod.sandia.gov/techlib/access-control.cgi/2011/116749.pdf), 67 pages.

Cornwall, "Deep Sleep. Boreholes drilled into Earth's crust get a fresh look for nuclear waste disposal," Science, vol. 349, Issue 6244, Jul. 10, 2015, 132-35.

Dozier, "Feasibility of Very Deep Borehole Disposal of US Nuclear Defense Wastes," Massachusetts Institute of Technology, Sep. 2011 (pp. 1-12).

Faybishenko et al., Editors, Lawrence Berkeley National Laboratory and Sandia National Laboratories: "International Approaches for Deep Geological Disposal of Nuclear Waste: Geological Challenges in Radioactive Waste Isolation", prepared for the US Department of Energy, Fifth Worldwide Review—2016, 474 pages.

Gibb et al., "A Model for Heat Flow in Deep Borehole Disposals of High-Level Nuclear Waste," Journal of Geophysical Research, vol. 113, dated May 6, 2008, 18 pages.

Gibbs, "Feasibility of Lateral Emplacement in Very Deep Borehole Disposal of High Level Nuclear Waste" master's thesis, Massachusetts Institute of Technology (2010) ("Gibbs") (available at: https://dspace.mit.edu/handle/1721.1/63242), 2 pages.

Hoag, "Canister Design for Deep Borehole Disposal of Nuclear Waste," Massachusetts Institute of Technology, May 2006 (pp. 1-6).

Neuzil et al., "Shale: An overlooked option forUS nuclear waste disposal," Bulletin of the Atomic Scientists Nov. 2014, Retrieved from the Internet: http://thebulletin .org/shale-overlooked-option-us-nuclear-waste-disposal7831 printed Sep. 26, 2016, 5 pages.

Neuzil, "Can Shale Safely Host U.S. Nuclear Waste?" EOS. vol. 94, No. 30, Dated Jul. 23, 2013, 3 pages.

PCT International Search Report and Written Opinion in International Appln. No. PCT/US2019/035324, dated Dec. 2, 2019, 19 pages.

PCT International Search Report and Written Opinio in International Appln. No. PCT/US2016/066539, dated Apr. 19, 2017, 13 pages.

PCT International Search Report and Written Opinion in International Appln. No. PCT/US2018/035974, dated Aug. 24, 2018, 13 pages.

Sone et al., "Mechanical properties of shale-gas reservoir rocks—Part 1:Static and dynamic elastic properties and anisotropy," Geophysics, vol. 78, No. 5, Sep. Oct. 2013, D381-92.

U.S. Nuclear Waste Technical Review Board, A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel (2015) ("NWTRB") (available at: http://www.nwtrb.gov/reports/disposal_options.pdf), 30 pages.

Vartabedian; "Decades-old war over Yucca Mountain nuclear dump resumes under Trump budget plan", Mar. 29, 2017, ralph.vartabdian@latimes.com; twitter @rvartabedian; 4 pages.

Winterle et al., Regulatory Perspectives on Deep Borehole Disposal Concepts, prepared for the U.S. Nuclear Regulatory Commission, Contract NRC-02-07006, Center for Nuclear Waste Regulatory Analyses, San Antonio, TX, May 2011, 24 pages.

YuccaMountain.org; Eureka County, Nevada—Nuclear Waste Office, FAQ, Eureka County Home, last updated Mar. 17, 2017; 12 pages.

Wikipedia.org [online], "Gamma camera," Dec. 26, 2019, retrieved on Jan. 1, 2020, retrieved from URL <https://en.wikipedia.org/wiki/Gamma_camera>, 5 pages.

PCT International Search Report and Written Opinion in International Appln. No. PCT/US2020/019206, dated Oct. 20, 2020, 10 pages.

* cited by examiner

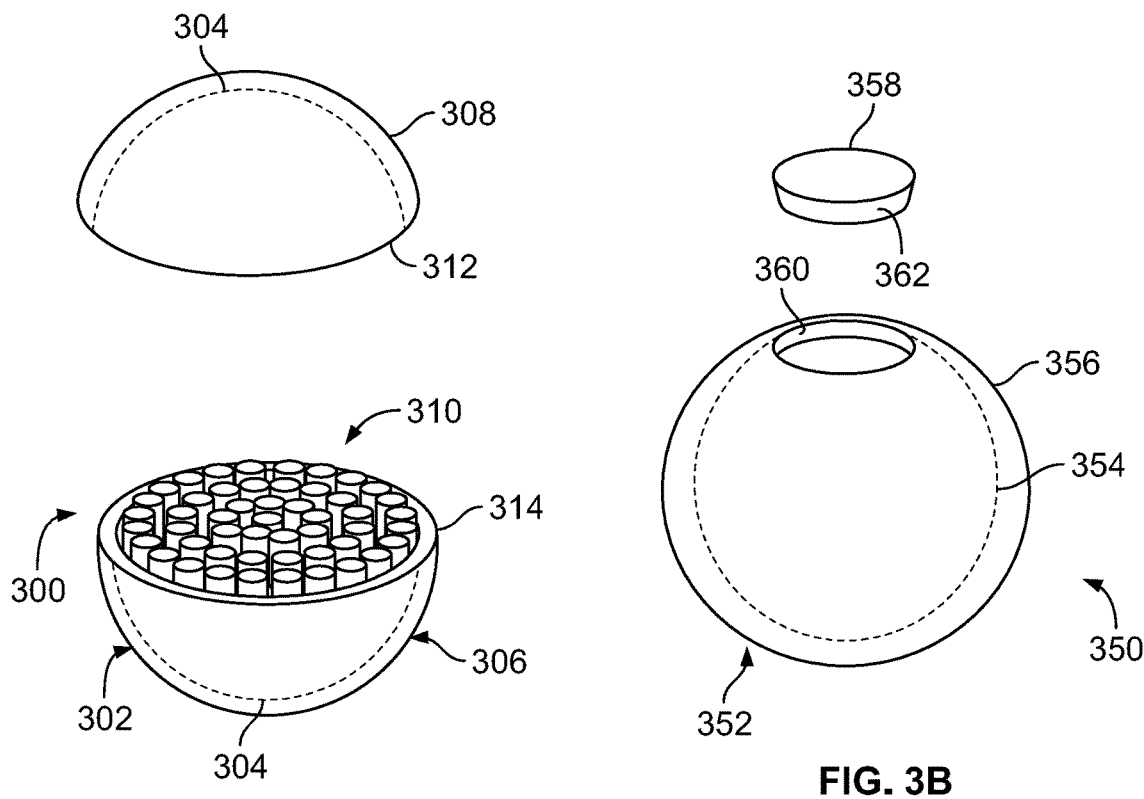
FIG. 3A
FIG. 3B
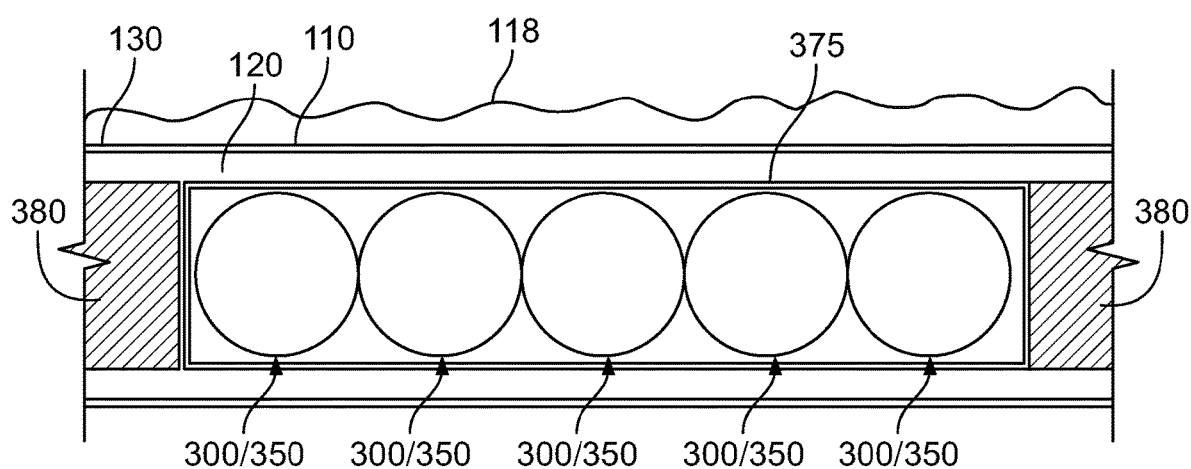
FIG. 3C

HAZARDOUS MATERIAL CANISTER SYSTEMS AND METHODS

CROSS-REFERENCE TO RELATED APPLICATIONS

This application claims priority under 35 U.S.C. § 119 to: U.S. Provisional Patent Application Ser. No. 62/808,594, filed on Feb. 21, 2019; U.S. Provisional Patent Application Ser. No. 62/808,516, filed on Feb. 21, 2019; U.S. Provisional Patent Application Ser. No. 62/808,591, filed on Feb. 21, 2019; U.S. Provisional Patent Application Ser. No. 62/808,570, filed on Feb. 21, 2019; U.S. Provisional Patent Application Ser. No. 62/808,571, filed on Feb. 21, 2019; and U.S. Provisional Patent Application Ser. No. 62/808,745, filed on Feb. 21, 2019. The entire contents of each of the previous applications are incorporated by reference herein.

TECHNICAL FIELD

This disclosure relates to hazardous material canister systems and methods.

BACKGROUND

Hazardous material, such as radioactive waste, is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even high-grade military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the Yucca Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In a general implementation, a method for inspecting a weld of a nuclear waste canister includes positioning a gamma ray image detector near a nuclear waste canister that encloses nuclear waste. The nuclear waste canister includes a housing that includes a volume in which the waste is enclosed and a top connected to the housing with at least one weld to seal the nuclear waste in the nuclear waste canister. The method further includes receiving, at the gamma ray image detector, gamma rays from the nuclear waste that travel through one or more voids in the weld; generating an image of the received gamma rays with the gamma ray image detector; and based on the generated image, determining an integrity of the at least one weld.

In an aspect combinable with the general implementation, the nuclear waste includes spent nuclear fuel.

In another aspect combinable with any of the previous aspects, the spent nuclear fuel includes at least one spent nuclear fuel assembly.

In another aspect combinable with any of the previous aspects, the gamma ray image detector includes a pinhole camera or an Anger camera.

In another aspect combinable with any of the previous aspects, at least one of the housing, the top, or a weld material includes a corrosion resistant alloy.

In another aspect combinable with any of the previous aspects, each of the housing, the top, and the weld material includes the corrosion resistant alloy.

In another aspect combinable with any of the previous aspects, the corrosion resistant alloy includes CRA 625.

In another aspect combinable with any of the previous aspects, the at least one weld includes a horizontal weld.

In another aspect combinable with any of the previous aspects, receiving the gamma rays includes receiving a plurality of gamma rays that emit from the nuclear waste and scatter through the volume of the nuclear waste container and through one or more voids in the one or more welds toward the gamma ray image detector.

Another aspect combinable with any of the previous aspects further includes rotating at least one of the nuclear waste canister or the gamma ray image detector during the receiving, at the gamma ray image detector, of the gamma rays from the nuclear waste that travel through the one or more voids in the weld.

In another aspect combinable with any of the previous aspects, the rotating includes rotating at least one of the nuclear waste canister or the gamma ray image detector for 360 degrees.

In another aspect combinable with any of the previous aspects, the at least one weld that connects the top to the housing includes a seal formed with a direct material deposition system.

In another general implementation, a system for inspecting a weld of a nuclear waste canister includes a nuclear waste canister that encloses nuclear waste, and a gamma ray image detector system positioned adjacent the nuclear waste canister. The nuclear waste canister includes a housing that includes a volume configured to enclose the nuclear waste and a top connected to the housing with at least one weld to seal the nuclear waste in the nuclear waste canister. The gamma ray image detector system is configured to perform operations including receiving gamma rays from the nuclear waste that travel through one or more voids in the weld; generating an image of the received gamma rays with at least one gamma ray image detector; and based on the generated image, determining an integrity of the at least one weld.

In an aspect combinable with the general implementation, the nuclear waste includes spent nuclear fuel.

In another aspect combinable with any of the previous aspects, the spent nuclear fuel includes at least one spent nuclear fuel assembly.

In another aspect combinable with any of the previous aspects, the gamma ray image detector system includes a pinhole camera or an Anger camera.

In another aspect combinable with any of the previous aspects, at least one of the housing, the top, or a weld material includes a corrosion resistant alloy.

In another aspect combinable with any of the previous aspects, each of the housing, the top, and the weld material includes the corrosion resistant alloy.

In another aspect combinable with any of the previous aspects, the corrosion resistant alloy includes CRA 625.

In another aspect combinable with any of the previous aspects, he at least one weld includes a horizontal weld.

In another aspect combinable with any of the previous aspects, the gamma ray image detector system is configured to receive a plurality of gamma rays that emit from the nuclear waste and scatter through the volume of the nuclear waste container and through one or more voids in the one or more welds.

In another aspect combinable with any of the previous aspects, at least one of the nuclear waste canister or the gamma ray image detector system is configured to rotate during operation of the gamma ray image detector system to receive the gamma rays from the nuclear waste that travel through the one or more voids in the weld.

In another aspect combinable with any of the previous aspects, the at least one of the nuclear waste canister or the gamma ray image detector system is configured to rotate 360 degrees during operation of the gamma ray image detector system to receive the gamma rays from the nuclear waste that travel through the one or more voids in the weld.

In another aspect combinable with any of the previous aspects, the at least one weld that connects the top to the housing includes a seal formed with a direct material deposition system.

Implementations of a hazardous material storage repository according to the present disclosure may include one or more of the following features. For example, a hazardous material storage repository according to the present disclosure may allow for multiple levels of containment of hazardous material within a storage repository located thousands of feet underground, decoupled from any nearby mobile water. As another example, implementations of a hazardous material canister according to the present disclosure may be more easily deployed in a hazardous material storage repository, while also being less susceptible to breakage or leakage of hazardous material stored therein due to a seismic event, such as an earthquake. As another example, implementations of a hazardous material canister according to the present disclosure may be more easily and efficiently inspected, e.g., to ensure that there are no leakage paths from an inner volume of the canister to an ambient environment. For instance, implementations of a hazardous material canister that include one or more welds may be more easily and efficiently inspected to ensure that there are little to no voids in the one or more welds using gamma ray radiography that includes a radioactive source internal to the hazardous material canister. As yet another example, implementations of a hazardous material canister according to the present disclosure may be more easily and efficiently sealed through, e.g., a spin welding or direct material deposition process.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3D are schematic illustrations of example implementations of a spherical hazardous material canister according to the present disclosure.

DETAILED DESCRIPTION

Figure 1:
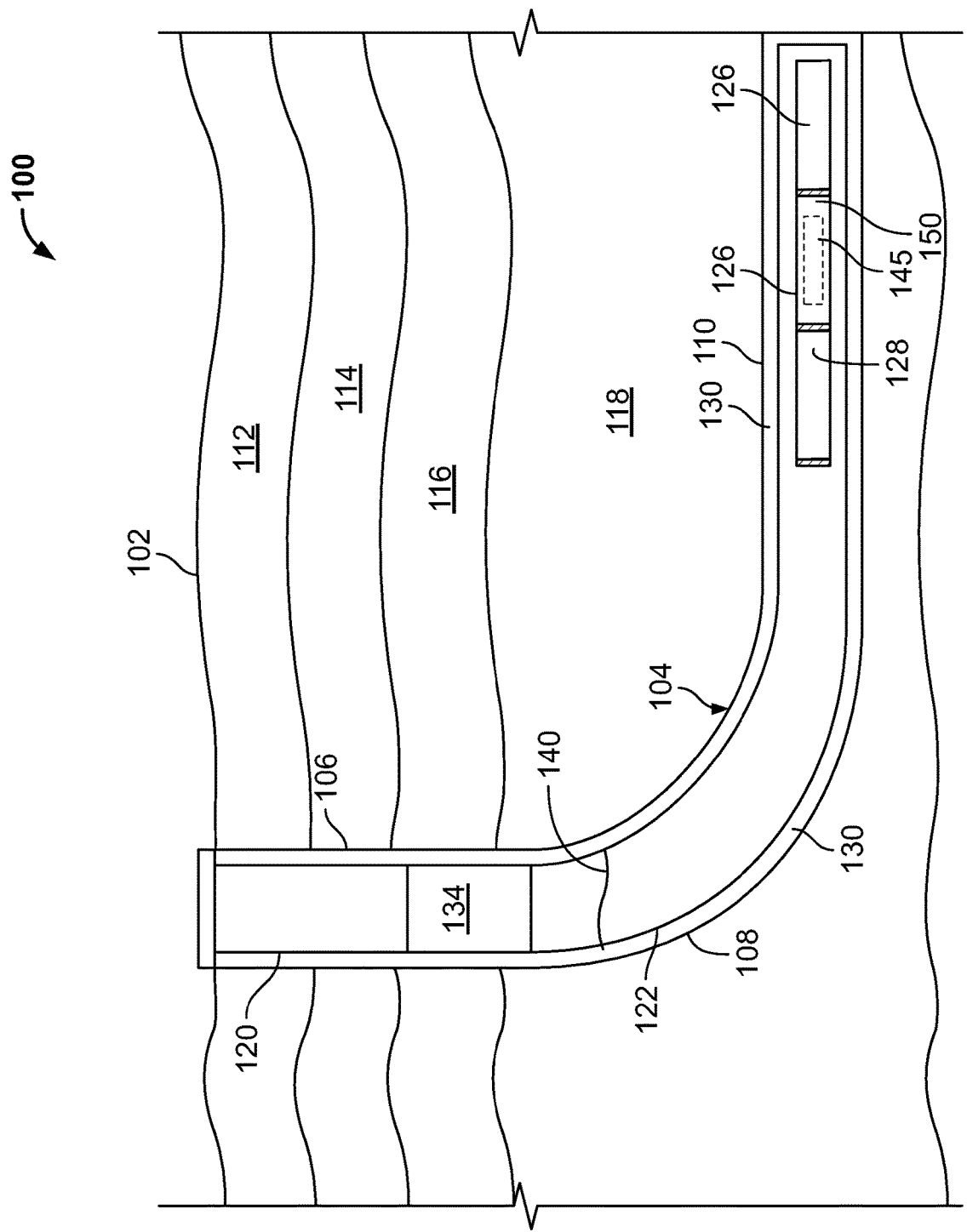
FIG. 1 is a schematic illustration of an example implementation of a hazardous material storage repository that includes one or more hazardous material canisters according to the present disclosure.

FIG. 1 is a schematic illustration of an example implementation of a hazardous material storage repository system 100, e.g., a subterranean location for the long-term (e.g., tens, hundreds, or thousands of years or more), but retrievable, safe and secure storage of hazardous material (e.g., radioactive material, such as nuclear waste which can be spent nuclear fuel (SNF) or high level waste, as two examples). For example, this figure illustrates the example hazardous material storage repository system 100 once one or more canisters 126 of hazardous material have been deployed in a subterranean formation 118. As illustrated, the hazardous material storage repository system 100 includes a drillhole 104 formed (e.g., drilled or otherwise) from a terranean surface 102 and through multiple subterranean layers 112, 114, 116, and 118. Although the terranean surface 102 is illustrated as a land surface, terranean surface 102 may be a sub-sea or other underwater surface, such as a lake or an ocean floor or other surface under a body of water. Thus, the present disclosure contemplates that the drillhole 104 may be formed under a body of water from a drilling location on or proximate the body of water.

The illustrated drillhole 104 is a directional drillhole in this example of hazardous material storage repository system 100. For instance, the drillhole 104 includes a substantially vertical portion 106 coupled to a radiussed or curved portion 108, which in turn is coupled to a substantially horizontal portion 110. As used in the present disclosure, "substantially" in the context of a drillhole orientation, refers to drillholes that may not be exactly vertical (e.g., exactly perpendicular to the terranean surface 102) or exactly horizontal (e.g., exactly parallel to the terranean surface 102), or exactly inclined at a particular incline angle relative to the terranean surface 102. In other words, vertical drillholes often undulate offset from a true vertical direction, that they might be drilled at an angle that deviates from true vertical, and inclined drillholes often undulate offset from a true incline angle. Further, in some aspects, an inclined drillhole may not have or exhibit an exactly uniform incline (e.g., in degrees) over a length of the drillhole. Instead, the incline of the drillhole may vary over its length (e.g., by 1-5 degrees). As illustrated in this example, the three portions of the drillhole 104—the vertical portion 106, the radiussed portion 108, and the horizontal portion 110—form a continuous drillhole 104 that extends into the Earth. As used in the present disclosure, the drillhole 104 (and drillhole portions described) may also be called wellbores. Thus, as used in the present disclosure, drillhole and wellbore are largely synonymous and refer to bores formed through one or more subterranean formations that are not suitable for human-occupancy (i.e., are too small in diameter for a human to fit therewithin).

The illustrated drillhole 104, in this example, has a surface casing 120 positioned and set around the drillhole 104 from the terranean surface 102 into a particular depth in the Earth. For example, the surface casing 120 may be a relatively large-diameter tubular member (or string of members) set (e.g., cemented) around the drillhole 104 in a shallow formation. As used herein, "tubular" may refer to a member that has a circular cross-section, elliptical cross-section, or other shaped cross-section. For example, in this implementation of the hazardous material storage repository system 100, the surface casing 120 extends from the terranean surface through a surface layer 112. The surface layer 112, in this example, is a geologic layer comprised of one or more layered rock formations. In some aspects, the surface layer 112 in this example may or may not include freshwater aquifers, salt water or brine sources, or other sources of mobile water (e.g., water that moves through a geologic formation). In some aspects, the surface casing 120 may isolate the drillhole 104 from such mobile water, and may also provide a hanging location for other casing strings to be installed in the drillhole 104. Further, although not shown, a conductor casing may be set above the surface casing 120 (e.g., between the surface casing 120 and the surface 102 and within the surface layer 112) to prevent drilling fluids from escaping into the surface layer 112.

As illustrated, a production casing 122 is positioned and set within the drillhole 104 downhole of the surface casing 120. Although termed a "production" casing, in this example, the casing 122 may or may not have been subject to hydrocarbon production operations. Thus, the casing 122 refers to and includes any form of tubular member that is set (e.g., cemented) in the drillhole 104 downhole of the surface casing 120. In some examples of the hazardous material storage repository system 100, the production casing 122 may begin at an end of the radiussed portion 108 and extend throughout the horizontal portion 110. The casing 122 could also extend into the radiussed portion 108 and into the vertical portion 106.

As shown, cement 130 is positioned (e.g., pumped) around the casings 120 and 122 in an annulus between the casings 120 and 122 and the drillhole 104. The cement 130, for example, may secure the casings 120 and 122 (and any other casings or liners of the drillhole 104) through the subterranean layers under the terranean surface 102. In some aspects, the cement 130 may be installed along the entire length of the casings (e.g., casings 120 and 122 and any other casings), or the cement 130 could be used along certain portions of the casings if adequate for a particular drillhole 104. The cement 130 can also provide an additional layer of confinement for the hazardous material in canisters 126.

The drillhole 104 and associated casings 120 and 122 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 120 may extend down to about 2500 feet TVD, with a diameter of between about 22 in. and 48 in. An intermediate casing (not shown) between the surface casing 120 and production casing 122 may extend down to about 8000 feet TVD, with a diameter of between about 16 in. and 36 in. The production casing 122 may extend inclinedly (e.g., to case the horizontal portion 110) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (112, 114, 116, and 118), particular drilling techniques, as well as a size, shape, or design of a hazardous material canister 126 that contains hazardous material to be deposited in the hazardous material storage repository system 100. In some alternative examples, the production casing 122 (or other casing in the drillhole 104) could be circular in cross-section, elliptical in cross-section, or some other shape.

As illustrated, the vertical portion 106 of the drillhole 104 extends through subterranean layers 112, 114, and 116, and, in this example, lands in a subterranean layer 118. As discussed above, the surface layer 112 may or may not include mobile water. In this example, a mobile water layer 114 is below the surface layer 112 (although surface layer 112 may also include one or more sources of mobile water or liquid). For instance, mobile water layer 114 may include one or more sources of mobile water, such as freshwater aquifers, salt water or brine, or other source of mobile water. In this example of hazardous material storage repository system 100, mobile water may be water that moves through a subterranean layer based on a pressure differential across all or a part of the subterranean layer. For example, the mobile water layer 114 may be a permeable geologic formation in which water freely moves (e.g., due to pressure differences or otherwise) within the layer 114. In some aspects, the mobile water layer 114 may be a primary source of human-consumable water in a particular geographic area. Examples of rock formations of which the mobile water layer 114 may be composed include porous sandstones and limestones, among other formations.

Other illustrated layers, such as the impermeable layer 116 and the storage layer 118, may include immobile water. Immobile water, in some aspects, is water (e.g., fresh, salt, brine), that is not fit for human or animal consumption, or both. Immobile water, in some aspects, may be water that, by its motion through the layers 116 or 118 (or both), cannot reach the mobile water layer 114, terranean surface 102, or both, within 10,000 years or more (such as to 1,000,000 years).

Below the mobile water layer 114, in this example implementation of hazardous material storage repository system 100, is an impermeable layer 116. The impermeable layer 116, in this example, may not allow mobile water to pass through. Thus, relative to the mobile water layer 114, the impermeable layer 116 may have low permeability, e.g., on the order of nanodarcy permeability. Additionally, in this example, the impermeable layer 116 may be a relatively non-ductile (i.e., brittle) geologic formation. One measure of non-ductility is brittleness, which is the ratio of compressive stress to tensile strength. In some examples, the brittleness of the impermeable layer 116 may be between about 20 MPa and 40 MPa.

As shown in this example, the impermeable layer 116 is shallower (e.g., closer to the terranean surface 102) than the storage layer 118. In this example rock formations of which the impermeable layer 116 may be composed include, for example, certain kinds of sandstone, mudstone, clay, and slate that exhibit permeability and brittleness properties as described above. In alternative examples, the impermeable layer 116 may be deeper (e.g., further from the terranean surface 102) than the storage layer 118. In such alternative examples, the impermeable layer 116 may be composed of an igneous rock, such as granite.

Below the impermeable layer 116 is the storage layer 118. The storage layer 118, in this example, may be chosen as the landing for the horizontal portion 110, which stores the hazardous material, for several reasons. Relative to the impermeable layer 116 or other layers, the storage layer 118 may be thick, e.g., between about 100 and 200 feet of total vertical thickness. Thickness of the storage layer 118 may allow for easier landing and directional drilling, thereby allowing the horizontal portion 110 to be readily emplaced within the storage layer 118 during constructions (e.g., drilling). If formed through an approximate horizontal center of the storage layer 118, the horizontal portion 110 may be surrounded by about 50 to 100 feet of the geologic formation that comprises the storage layer 118. Further, the storage layer 118 may also have only immobile water, e.g., due to a very low permeability of the layer 118 (e.g., on the order of milli- or nanodarcys). In addition, the storage layer 118 may have sufficient ductility, such that a brittleness of the rock formation that comprises the layer 118 is between about 3 MPa and 10 MPa. Examples of rock formations of which the storage layer 118 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 114.

In some examples implementations of the hazardous material storage repository system 100, the storage layer 118 (and/or the impermeable layer 116) is composed of shale. Shale, in some examples, may have properties that fit within those described above for the storage layer 118. For example, shale formations may be suitable for a long-term confinement of hazardous material (e.g., in the hazardous material canisters 126), and for their isolation from mobile water layer 114 (e.g., aquifers) and the terranean surface 102. Shale formations may be found relatively deep in the Earth, typically 3000 feet or greater, and placed in isolation below any fresh water aquifers. Other formations may include salt or other impermeable formation layer.

Shale formations (or salt or other impermeable formation layers), for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of substantial fractions of such fluids into surrounding layers (e.g., mobile water layer 114). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

In some aspects, the formation of the storage layer 118 and/or the impermeable layer 116 may form a leakage barrier, or barrier layer to fluid leakage that may be determined, at least in part, by the evidence of the storage capacity of the layer for hydrocarbons or other fluids (e.g., carbon dioxide) for hundreds of years, thousands of years, tens of thousands of years, hundreds of thousands of years, or even millions of years. For example, the barrier layer of the storage layer 118 and/or impermeable layer 116 may be defined by a time constant for leakage of the hazardous material more than 10,000 years (such as between about 10,000 years and 1,000,000 years) based on such evidence of hydrocarbon or other fluid storage.

Shale (or salt or other impermeable layer) formations may also be at a suitable depth, e.g., between 3000 and 12,000 feet TVD. Such depths are typically below ground water aquifer (e.g., surface layer 112 and/or mobile water layer 114). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., impermeable layer 116). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., dolomite or otherwise). For example, rock formations in the impermeable layer 116 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 112, 114, 116, and 118. For example, there may be repeating patterns (e.g., vertically), of one or more of the mobile water layer 114, impermeable layer 116, and storage layer 118. Further, in some instances, the storage layer 118 may be directly adjacent (e.g., vertically) the mobile water layer 114, i.e., without an intervening impermeable layer 116. In some examples, all or portions of the radiussed drillhole 108 and the horizontal drillhole 110 may be formed below the storage layer 118, such that the storage layer 118 (e.g., shale or other geologic formation with characteristics as described herein) is vertically positioned between the horizontal drillhole 110 and the mobile water layer 114.

In this example, the horizontal portion 110 of the drillhole 104 includes a storage area in a distal part of the portion 110 into which hazardous material may be retrievably placed for long-term storage. For example, a work string (e.g., tubing, coiled tubing, wireline, or otherwise) or other downhole conveyance (e.g., tractor) may be moved into the cased drillhole 104 to place one or more (three shown but there may be more or less) hazardous material canisters 126 into long term, but in some aspects, retrievable, storage in the portion 110.

Each canister 126 may enclose hazardous material (shown as material 145). Such hazardous material, in some examples, may be biological or chemical waste or other biological or chemical hazardous material. In some examples, the hazardous material may include nuclear material, such as SNF recovered from a nuclear reactor (e.g., commercial power or test reactor) or military nuclear material. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life). Other hazardous material 145 may include, for example, radioactive liquid, such as radioactive water from a commercial power (or other) reactor.

In some aspects, the storage layer 118 should be able to contain any radioactive output (e.g., gases) within the layer 118, even if such output escapes the canisters 126. For example, the storage layer 118 may be selected based on diffusion times of radioactive output through the layer 118. For example, a minimum diffusion time of radioactive output escaping the storage layer 118 may be set at, for example, fifty times a half-life for any particular component of the nuclear fuel pellets. Fifty half-lives as a minimum diffusion time would reduce an amount of radioactive output by a factor of $1 \times 10^{15}$. As another example, setting a minimum diffusion time to thirty half-lives would reduce an amount of radioactive output by a factor of one billion.

For example, plutonium-239 is often considered a dangerous waste product in SNF because of its long half-life of 24,100 years. For this isotope, 50 half-lives would be 1.2 million years. Plutonium-239 has low solubility in water, is not volatile, and as a solid, its diffusion time is exceedingly small (e.g., many millions of years) through a matrix of the rock formation that comprises the illustrated storage layer 118 (e.g., shale or other formation). The storage layer 118, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

In some aspects, the drillhole 104 may be formed for the primary purpose of long-term storage of hazardous materials. In alternative aspects, the drillhole 104 may have been previously formed for the primary purpose of hydrocarbon production (e.g., oil, gas). For example, storage layer 118 may be a hydrocarbon bearing formation from which hydrocarbons were produced into the drillhole 104 and to the terranean surface 102. In some aspects, the storage layer 118 may have been hydraulically fractured prior to hydrocarbon production. Further in some aspects, the production casing 122 may have been perforated prior to hydraulic fracturing. In such aspects, the production casing 122 may be patched (e.g., cemented) to repair any holes made from the perforating process prior to a deposit operation of hazardous material. In addition, any cracks or openings in the cement between the casing and the drillhole can also be filled at that time.

As further shown in FIG. 1, a backfill material 140 may be positioned or circulated into the drillhole 104. In this example, the backfill material 140 surrounds the canisters 126 and may have a level that extends uphole to at or near a drillhole seal 134 (e.g., permanent packer, plug, or other seal). In some aspects, the backfill material 140 may absorb radioactive energy (e.g., gamma rays or other energy). In some aspects, the backfill material 140 may have a relatively low thermal conductivity, thereby acting as an insulator between the canisters 126 and the casings.

As further shown in FIG. 1, another backfill material 150 may be positioned or placed within one or more of the canisters 126 to surround the hazardous material 145. In some aspects, the backfill material 150 may absorb radioactive energy (e.g., gamma rays or other energy). In some aspects, the backfill material 150 may have a relatively low thermal conductivity, thereby acting as an insulator between the hazardous material 145 and the canister 126. In some aspects, the backfill material 150 may also provide a stiffening attribute to the canister 126, e.g., reducing crushability, deformation, or other damage to the canister 126.

In some aspects, one or more of the previously described components of the system 100 may combine to form an engineered barrier of the hazardous waste material repository 100. For example, in some aspects, the engineered barrier is comprised of one, some, or all of the following components: the storage layer 118, the casing 122, the backfill material 140, the canister 126, the backfill material 150, the seal 134, and the hazardous material 145, itself. In some aspects, one or more of the engineered barrier components may act (or be engineered to act) to: prevent or reduce corrosion in the drillhole 104, prevent or reduce escape of the hazardous material 145; reduce or prevent thermal degradation of one or more of the other components; and other safety measures to ensure that the hazardous material 145 does not reach the mobile water layer 114 (or surface layer 112, including the terranean surface 102).

Figure 2:
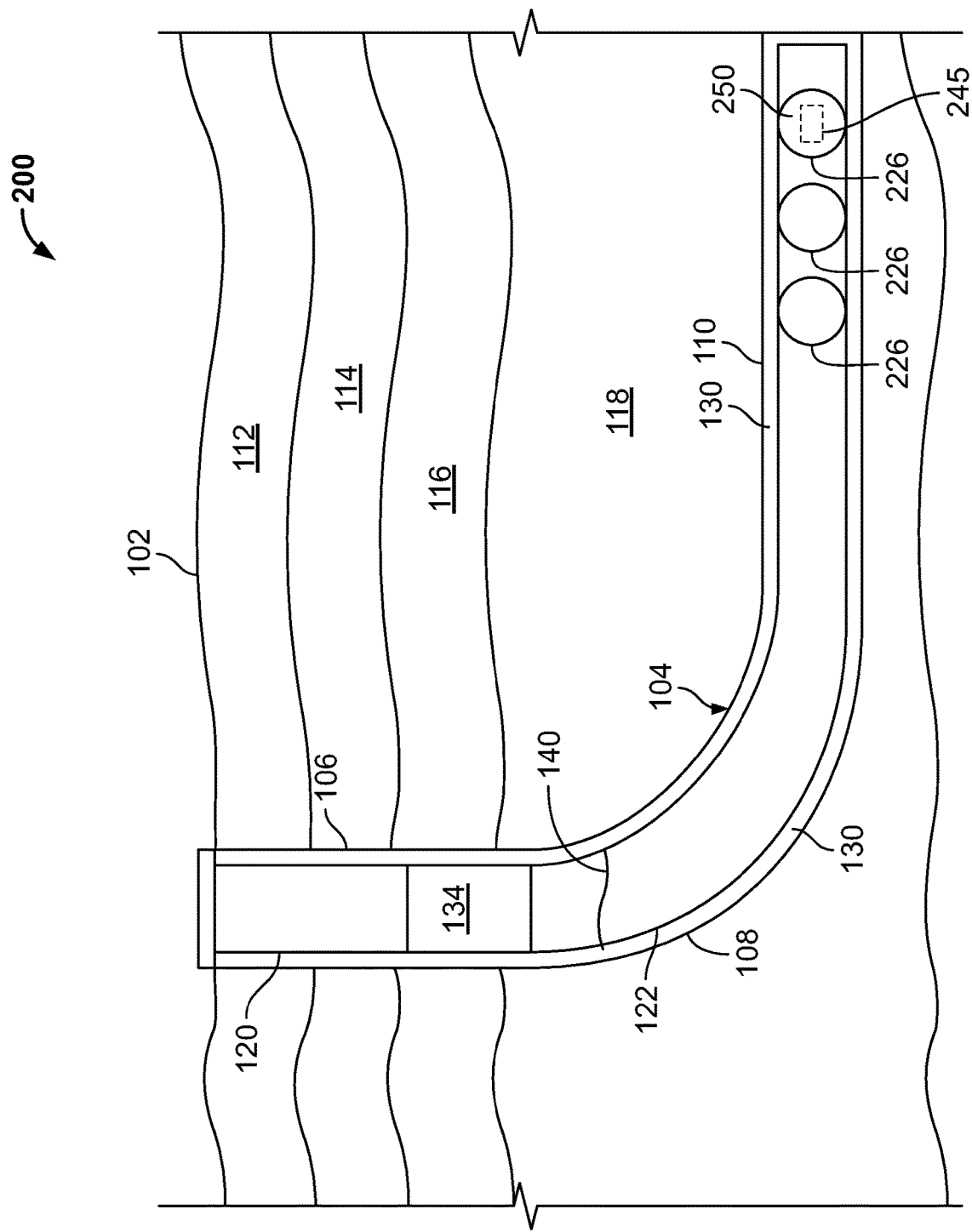
FIG. 2 is a schematic illustration of another example implementation of a hazardous material storage repository that includes one or more hazardous material canisters according to the present disclosure.

FIG. 2 is a schematic illustration of an example implementation of a hazardous material storage repository system 200, e.g., a subterranean location for the long-term (e.g., tens, hundreds, or thousands of years or more), but retrievable, safe and secure storage of hazardous material. In some aspects, one or more components of repository 200 may be similar to components described in reference to the hazardous material repository 100 (shown with like reference numbers). For example, this figure illustrates the example hazardous material storage repository system 200 once one or more canisters 226 of hazardous material have been deployed in a subterranean formation 118. In this example implementation, at least one of the canisters deployed in the subterranean formation comprises a spherical hazardous material canister 226 (three shown in this example).

Each canister 226 may enclose hazardous material (shown as material 245). Such hazardous material, in some examples, may be biological or chemical waste or other biological or chemical hazardous material. In some examples, the hazardous material may include nuclear material, such as SNF recovered from a nuclear reactor (e.g., commercial power or test reactor) or military nuclear material. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life). Other hazardous material 245 may include, for example, radioactive liquid, such as radioactive water from a commercial power (or other) reactor.

As further shown in FIG. 1, a backfill material 140 may be positioned or circulated into the drillhole 104. In this example, the backfill material 140 surrounds the canisters 126 and may have a level that extends uphole to at or near a drillhole seal 134 (e.g., permanent packer, plug, or other seal). In some aspects, the backfill material 140 may absorb radioactive energy (e.g., gamma rays or other energy). In some aspects, the backfill material 140 may have a relatively low thermal conductivity, thereby acting as an insulator between the canisters 126 and the casings.

As further shown in FIG. 2, another backfill material 250 may be positioned or placed within one or more of the canisters 226 to surround the hazardous material 245. In some aspects, the backfill material 250 may absorb radioactive energy (e.g., gamma rays or other energy). In some aspects, the backfill material 250 may have a relatively low thermal conductivity, thereby acting as an insulator between the hazardous material 245 and the canister 226. In some aspects, the backfill material 250 may also provide a stiffening attribute to the canister 226, e.g., reducing crushability, deformation, or other damage to the canister 226.

In some aspects, one or more of the previously described components of the system 200 may combine to form an engineered barrier of the hazardous waste material repository 200. For example, in some aspects, the engineered barrier is comprised of one, some, or all of the following components: the storage layer 118, the casing 122, the backfill material 140, the canister 226, the backfill material 250, the seal 134, and the hazardous material 245, itself. In some aspects, one or more of the engineered barrier components may act (or be engineered to act) to: prevent or reduce corrosion in the drillhole 104, prevent or reduce escape of the hazardous material 245; reduce or prevent thermal degradation of one or more of the other components; and other safety measures to ensure that the hazardous material 245 does not reach the mobile water layer 114 (or surface layer 112, including the terranean surface 102).

Although described as a spherical canister 226, the canister 226 may be substantially spherical (e.g., not exactly spherical in exterior shape but close to spherical). For example, in some aspects, the spherical canister 226 may have one or more flat or substantially flat portions (e.g., at opposite poles, such as a globe). In some aspects, the canister 226 may be exactly spherical.

The spherical canister 226 may be deployed into the drillhole 104 by, for example, a downhole conveyance (e.g., a tubular conveyance or wireline conveyance). In alternative aspects, the spherical canister 226 may be deployed into the drillhole 104 by a downhole tractor. In some aspects, due to the spherical (or substantially spherical) shape of the exterior housing of the canister 226, deployment of the canister 226 into the drillhole 104 may also include rolling the canister 226 through one or more portions of the drillhole 104. In some aspects, due to the spherical (or substantially spherical) shape of the exterior housing of the canister 226, at least a portion of the drillhole 104 (e.g., some or all of the substantially horizontal portion 110) may be angled vertically away from the terranean surface 102 so that the canister 226 does not move (e.g., by force of gravity) from the portion 110 toward the substantially vertical portion 106 after deployment.

Figure 3D:
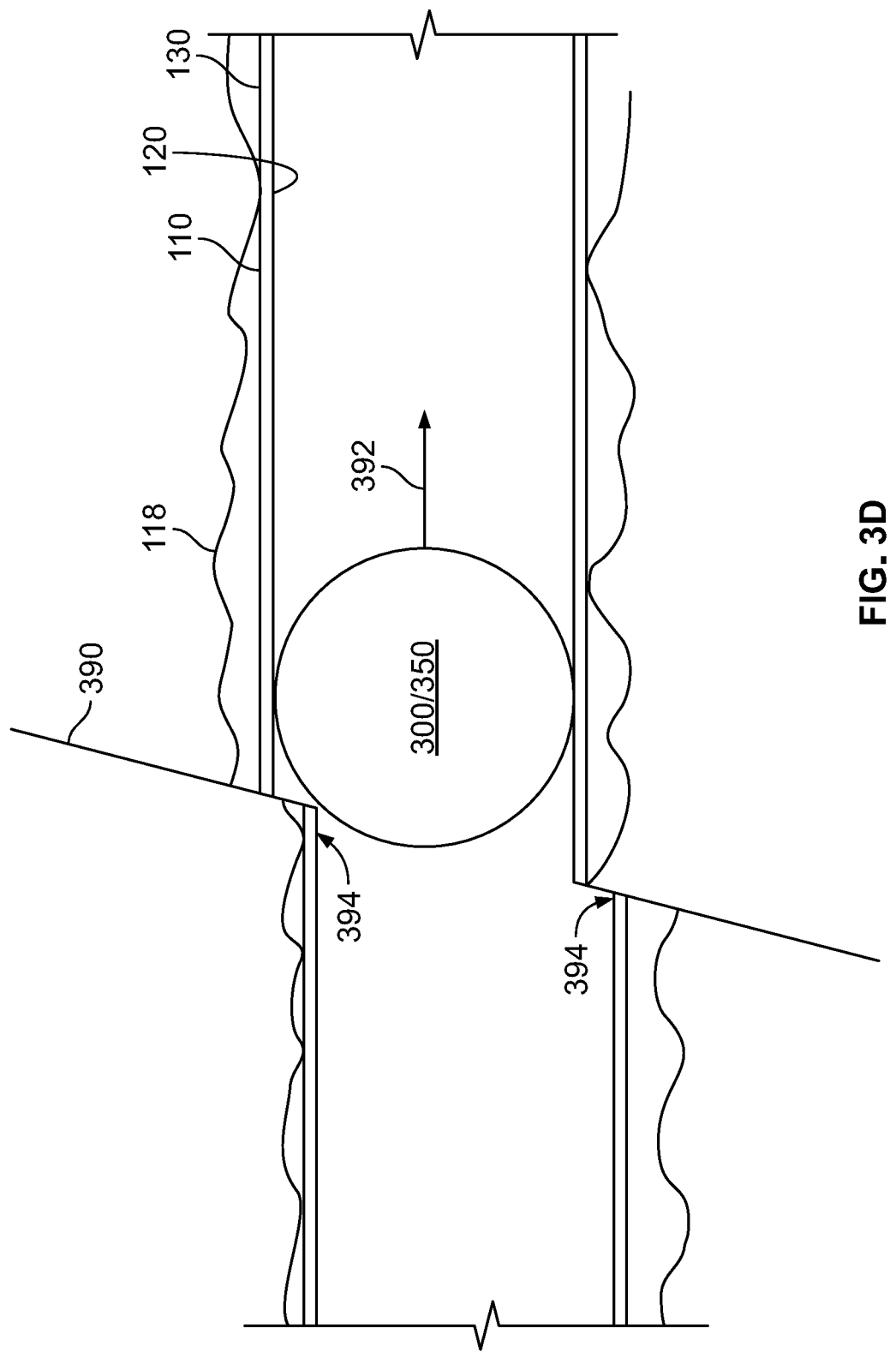

FIGS. 3A-3D are schematic illustrations of example implementations of a spherical hazardous material canister, such as the spherical hazardous material canister 226 shown in FIG. 2. FIG. 3A shows an example implementation of a spherical canister 300, while FIG. 3B shows another example implementation of a spherical canister 350. Each of canisters 300 and 350 may store hazardous material, such as radioactive waste. In some aspects, the radioactive waste may comprise SNF (e.g., SNF pellets are at least a portion of a SNF assembly) or high level radioactive waste. In some aspects, one or both of spherical canisters 300 and 350 may be utilized as a spherical hazardous waste canister 226 as shown in the hazardous waste repository 200 in FIG. 2.

Spherical canister 300 is shown in FIG. 3A and includes a spherical (or substantially spherical) housing 302 comprised of a top portion 308 (or cap 308) and a bottom portion 306. Each portion 308 and 306 are at least partially hollow such that, when joined, an interior volume 304 (represented in dashed line) is defined within the housing 302. The bottom portion 306 includes an edge 314 that has a dimension (e.g., circumference) that is substantially similar, if not identical to, a dimension (e.g., circumference) of an edge 312 of the top portion 308. As shown in FIG. 3A, hazardous material 310 in the form of SNF (i.e., nuclear or radioactive waste) is positioned in the interior volume 304 of the bottom portion 306 of the housing 302. In some aspects, one or both of the edges 312 and 314 may be beveled or angled in order to more sealingly mate with the other of the edges.

In example implementations, the canister 300 may be from 4 to 12 inches in diameter, and made of a corrosion-resistant alloy, such as Alloy-625. In the example of the hazardous material 310 being SNF pellets, the SNF pellets (which, in an assembly for commercial nuclear fuel are cylindrical in shape) are typically 1 cm in diameter, and 1 cm in length. The SNF pellets are comprised primarily of $UO_2$ ceramic with a density of 10 g/cm$^3$. As shown in FIG. 3A, the housing 302 of the spherical canister 300 generally is made of two hemispheres: top portion 308 and bottom portion 306. In this example, the bottom portion 306 may be filled with stacked SNF rods (or portions of such rods). These rods consist of small pipes that hold the SNF pellets. Longer fuel rods are used in commercial and defense fuel assemblies and typically made of an alloy of zirconium; however, these rods can be made of a different material. That material could be a corrosion-resistant alloy and/or it could contain a neutron absorber such as boron to reduce the likelihood of the fuel configuration reaching criticality. The rods could be stacked in a hexagonal close-packed array.

In an assembly operation of the spherical canister 300, when the bottom portion 306 of the housing 302 is filled with fuel pellets (i.e., the volume 304 is filled), then the top portion 308 (e.g., the lid) would be placed on the bottom portion 306, and the two hemispheres joined or sealed (e.g., threadingly, by welding, by adhesive, by mechanical fasteners, or otherwise) by joining or sealing the edges 312 and 314 together. One method for welding might be spin-welding (friction welding). The edges 312 and 314 welded together could be radial in direction, or they could be canted to provide greater surface area and to facilitate placement and centering. In an example implementation, the spherical housing 302 is a 4-inch inner diameter sphere that would have volume of 108 cm$^3$ and might hold 80 SNF pellets (allowing for imperfect packing and the volume of the rods). An 8 inch diameter sphere housing 300 could hold about eight times as many SNF pellets.

FIG. 3B shows a spherical canister 350. Spherical canister 350 includes a spherical (or substantially spherical) housing 352 comprised of a lid 358 and a bottom portion 356. In contrast to the canister 300, the bottom portion 356 of the canister 350 defines all or most of an interior volume 354, while the lid 358 simply seals a small portion of the housing 352. Thus, the canister 350, instead of having two hemispherical portions of substantially similar size, includes a lid 358 that is smaller (and possibly much smaller) than the bottom portion 356. When joined, the interior volume 354 (represented in dashed line) is defined within the housing 352. The bottom portion 356 includes an edge 360 formed in a surface of the bottom portion 356 that has a dimension (e.g., circumference) that is substantially similar, if not identical to, a dimension (e.g., circumference) of an edge 362 of the lid 358. Although not specifically shown in FIG. 3B, hazardous material (such as material 310) in the form of SNF (i.e., nuclear or radioactive waste) is positionable in the interior volume 354 of the bottom portion 356 of the housing 352. In some aspects, one or both of the edges 360 and 362 may be beveled or angled in order to more sealingly mate with the other of the edges.

In example implementations, the canister 350 may be from 4 to 12 inches in diameter, and made of a corrosion-resistant alloy, such as Alloy-625. In the example of the hazardous material being SNF pellets, the SNF pellets (which, in an assembly for commercial nuclear fuel are cylindrical in shape) are typically 1 cm in diameter, and 1 cm in length. The SNF pellets are comprised primarily of $UO_2$ ceramic with a density of 10 g/cm$^3$. In this example, the bottom portion 356 may be filled with stacked SNF rods (or portions of such rods). These rods consist of small pipes that hold the SNF pellets. Longer fuel rods are used in commercial and defense fuel assemblies and typically made of an alloy of zirconium; however, these rods can be made of a different material. That material could be a corrosion-resistant alloy and/or it could contain a neutron absorber such as boron to reduce the likelihood of the fuel configuration reaching criticality. The rods could be stacked in a hexagonal close-packed array.

In an assembly operation of the spherical canister 350, when the bottom portion 356 of the housing 302, and therefore the interior volume 354, is filled with fuel pellets, then the lid 358 is placed on the bottom portion 356. The lid 358 is then joined or sealed (e.g., threadingly, by welding, by adhesive, by mechanical fasteners, or otherwise) to the bottom portion 356 by joining or sealing the edges 360 and 362 together. One method for welding might be spin-welding (friction welding). The edges 360 and 362 that are welded together could be radial in direction, or they could be canted to provide greater surface area and to facilitate placement and centering. In an example implementation, the spherical housing 352 is a 4-inch inner diameter sphere that would have volume of 108 $cm^3$ and might hold 80 SNF pellets (allowing for imperfect packing and the volume of the rods). An 8 inch diameter sphere housing 350 could hold about eight times as many SNF pellets.

In some aspects of spherical canister 350, individual SNF pellets may be placed in the bottom portion 356 without being in rod form (i.e., not as a SNF rod or rod portion). The SNF pellets may fill the bottom portion, and then the lid will be placed on top and welded to the lower section. The lower section might be shaken or vibrated as the pellets fall in to improve the packing. But the SNF pellets, in this configuration, may not be necessarily arranged in an orderly fashion.

In some aspects, example spherical canisters 300 and 350 (either or both) may be crush-resistant. For example, the interior volumes 304 and/or 354 may be filled (all or partially, once the hazardous waste is included therein) with a fill material that is strong under compression, such as sand. The fill material may also be any solid that is strong under compression. In an example aspect, the filling material between the SNF (in rod or pellet form) is sand saturated with a gas that helps conduct heat from the radioactivity of the pellets. That gas could be helium, argon, or nitrogen (as some examples).

Although both canisters 300 and 350 are shown and described as being spherical or substantially spherical in external shape, other external shapes are contemplated by the present disclosure. For example, a shape of the canister 300 or 350 may be a compromise between sphere and cylinder; the shape could be elliptical or cylindrical with rounded edges. Although some of the advantages of the spherical shape may be compromised, there can be advantages in handling and filling of a canister that included an elongated external shape.

Turning to FIG. 3C, this figure illustrates another example implementation of a hazardous waste storage system that includes one or more spherical canisters. FIG. 3C illustrates a cross-section of a hazardous material canister 375 that is deployed in a hazardous material repository (a portion of which is shown in FIG. 3C). As shown, the hazardous material canister 375 may be cylindrical or substantially cylindrical in shape and sized to enclose one or more spherical canisters, such as one or more spherical canisters 300 or 350. In some aspects, canister 375 may be used as canister 126 as shown in FIG. 1. The spherical canisters 300 or 350, as shown can be placed inside of the cylindrical canister 375, e.g., to simplify handling of hazardous material. For example, a large number of spherical canisters 300 or 350 could be placed inside the canister 375, which, in some aspects, is similar in shape to a SNF assembly (e.g., a single SNF assembly). The hazardous material canister 375 may be, e.g., 5 to 12 inches in inner diameter and 1 to 20 feet long. As shown, the canister 375 is positioned in the substantially horizontal portion 110 of the drillhole 104.

In some aspects, shielding 380 may be positioned at one or both ends of the canister 375. In some aspects, the shielding 380 may be attached to or integral with the hazardous material canister 375. The shielding 380 may be a radiation shielding (e.g., to reduce or stop gamma radiation from escaping the canister 375) or contact shielding (e.g., to reduce or eliminate damage to the canister 375 due to contact from other canisters or objects), or both. In some aspects, the hazardous material canister 375 may be made of corrosion-resistant alloy or of some other material. The hazardous material canister 375 may simplify handling and placement of the hazardous material in a deep, human-unoccupiable directional drillhole. In addition, the hazardous material canister 375 may provide an additional engineered barrier to escape of hazardous material, such as radioisotopes from SNF. The hazardous material canister 375 may be designed to hold a linear array of spherical canisters 300 or 350. Alternatively, the hazardous material canister 375 may be larger and enclose several (e.g., 3) side-by-side linear arrays of spherical canisters 300 or 350. In some aspects, multiple linear arrays may provide for more efficient use of the volume of the hazardous material canister 375 as well as drillhole. In some aspects, space within the hazardous material canister 375 that is not occupied by the one or more spherical canisters 300 or 350 may be filled with a sand-like material, a liquid, or a gas. In some aspects, the hazardous material canister 375 includes a frame mounted in its interior volume that holds the spherical canisters 300 or 350 in place inside the hazardous material canister 375. The hazardous material canister 375, in some aspects, may be rectangular in cross-section rather than circular. Other cross-sectional shapes, such as hexagonal, are also contemplated by the present disclosure.

In some aspects, implementations of a hazardous material spherical canister according to the present disclosure may provide an additional measure of protection against the unwanted release of hazardous material stored in a hazardous waste repository in a geographic area that experiences seismic events, such as earthquakes. For example, it is widely believed that underground disposal (e.g., in deep, human-unoccupiable directional drillholes) of nuclear waste (e.g., SNF or high level waste) cannot be done safely in regions in which earthquakes are likely. Since some nuclear waste is generated in regions that have large and frequent earthquakes (e.g., nuclear waste from commercial nuclear reactors in California, Taiwan, South Korea, and Japan to name a few), that assumption requires a distant location for disposal. Distant disposal can create legal issues (some countries are mandated to dispose within the country) and real or perceived risks from transportation.

In some aspects, the shaking caused by a nearby earthquake is not the primary danger to a hazardous material (e.g., nuclear waste) canister positioned in a hazardous waste repository of a deep directional drillhole formed in a subterranean formation. The reason is that such accelerations are typically less than 1 g (i.e., less than 980 gal, where a gal is the standard unit for acceleration, equal to 1 cm per second per second). Such accelerations present threats to surface structures, but nuclear waste canisters are designed to endure much stronger accelerations.

In some aspects, the greater danger from an earthquake is that a fault (created or caused or moved by the earthquake) will shear through the hazardous waste repository of the drillhole, which in turn can damage one or more nuclear waste canisters positioned in the repository (thereby causing radioactive waste to leak into water in the subterranean formation. Such canisters, for example, may have a large length to cross-section ratio (e.g., long and thin, designed to store one or more SNF assemblies). Such canister, for instance, may store nuclear waste (e.g., SNF) in unmodified fuel assemblies for placement in the deep directional drillhole. Such fuel assemblies are typically 8 to 12 inches in diameter and 14 feet long; the canister to hold an unmodified SNF assembly would be similar in diameter and length. Thus, it is the long and narrow shape of the fuel assembly canisters that may make them vulnerable to being sheared by an earthquake fault that crosses the hazardous waste repository of the drillhole.

As previously described and shown in FIGS. 3A-3C, example implementations of the present disclosure include a nuclear waste canister that encloses nuclear waste (e.g., SNF or high level waste) for storage in a deep directional drillhole, where the canister includes a spherical or substantially spherical housing. Such a spherical nuclear waste canister, in some aspects, may be less susceptible to breakage or leakage in the event of an earthquake that creates a fault that shears the hazardous waste repository of the deep directional drillhole. In some aspects, the nuclear waste, such as a SNF assembly, may be repackaged to fit into the spherical nuclear waste canister.

The example implementations of a canister that is shaped as a small sphere may be very resistant to shear from an earthquake. The spherical shape of the housing makes the canister more resistant to crushing compared to canisters of any other shape. A torque on the spherical canister will tend to rotate it rather than to bend it, as would be the case for a canister whose length and width are unequal.

As also previously described, the spherical canisters can also be placed inside of a longer cylindrical canister, to simplify handling. For example, a large number of spherical canisters could be placed inside a long outer canister, one that is similar in shape to the original fuel assembly. That canister might be 5 to 12 inches in inner diameter and 1 to 20 feet long. The outer canister also provides some protection against shear from earthquakes.

Earthquake faults can have a range of transverse extent, from millimeters to kilometers. If the boundary is sharp, then there will be a shearing force placed across the spherical canister. Unless the narrow line of the earthquake discontinuity lies exactly in the plane of symmetry of the sphere, the shearing force will become, in part, a force along the axis of the drillhole, and will force the sphere to move in that direction, provided that there is space to move. To provide that space, gaps may be left between the spherical nuclear waste canisters (or between outer canisters such as canister 375 that encloses multiple spherical canisters and may be filled with a fluid or other material that will yield when a force is placed on it). Once the spherical canister is more on one side of the drillhole than the other, the shearing force will be greater (as it occurs across the curved part of the spherical canister) and it will continue to push the spherical canister into the drillhole.

This is illustrated in FIG. 3D. For example, as shown, a fault 390 (naturally occurring or due to seismic activity) ruptures 394 an engineered barrier of a hazardous waste repository, such as, for example, the casing 120 and cement 130 installed in the horizontal portion 110 of the drillhole 104. A force 392 acts on the spherical canister (300 or 350). The component of the force on the spherical canister 300 or 350 along the axis of the casing 120 pushes the spherical canister 300 or 350 further along in the hazardous waste repository of the deep directional drillhole and away from the fault line 390. This movement reduces the force 392 on the spherical canister 300 or 350 and places the spherical canister 300 or 350 in a location that prevents any danger of shearing of the canister (thereby releasing hazardous material).

Although earthquake faults can be very narrow, as shown in FIG. 3D, they can also be broad and filled with crushed rock or rock that was crushed when the fault moved. In such a situation, the forces on the spherical canister 300 or 350 may tend to rotate the canister. The advantage of a spherical canister 300 or 350 is that such a canister can rotate without changing an opening in the rock formation in which it is contained in the repository (e.g., formation 118).

FIG. 4-8 are schematic illustrations of example implementations of a hazardous material canister according to the present disclosure. Although the illustrated implementations of the hazardous material canisters are shown as cylindrical or substantially cylindrical in shape, other shapes, such as spherical or substantially spherical, square or rectangular in radial cross-section, or otherwise, are also contemplated by the present disclosure. Each example implementation of a hazardous material canister shown in FIGS. 4-8 is designed to store (perhaps permanently) hazardous waste in deep, human-unoccupiable directional drillholes (e.g., wellbores). In some aspects, each example implementation of a hazardous material canister shown in FIGS. 4-8 is designed to be retrievable from the deep, human-unoccupiable directional drillhole to a terranean surface, when needed. The hazardous material can be chemical, biological, or, in many examples, radioactive (e.g., nuclear) in nature. For example, hazardous material may be SNF or high level radioactive waste, with either type being in solid, liquid, or gaseous form as stored in the hazardous material canister. In some aspects, each example implementation of a hazardous material canister shown in FIGS. 4-8 is part of an engineered barrier system that prevents the hazardous material from migrating to a source of ground water or other source of mobile water that can move to consumable water sources. For example, such ground water could dissolve components of the waste and transport the dissolved radioactive components to the terranean surface and contaminate human- (or animal-) consumable water.

Figure 4:
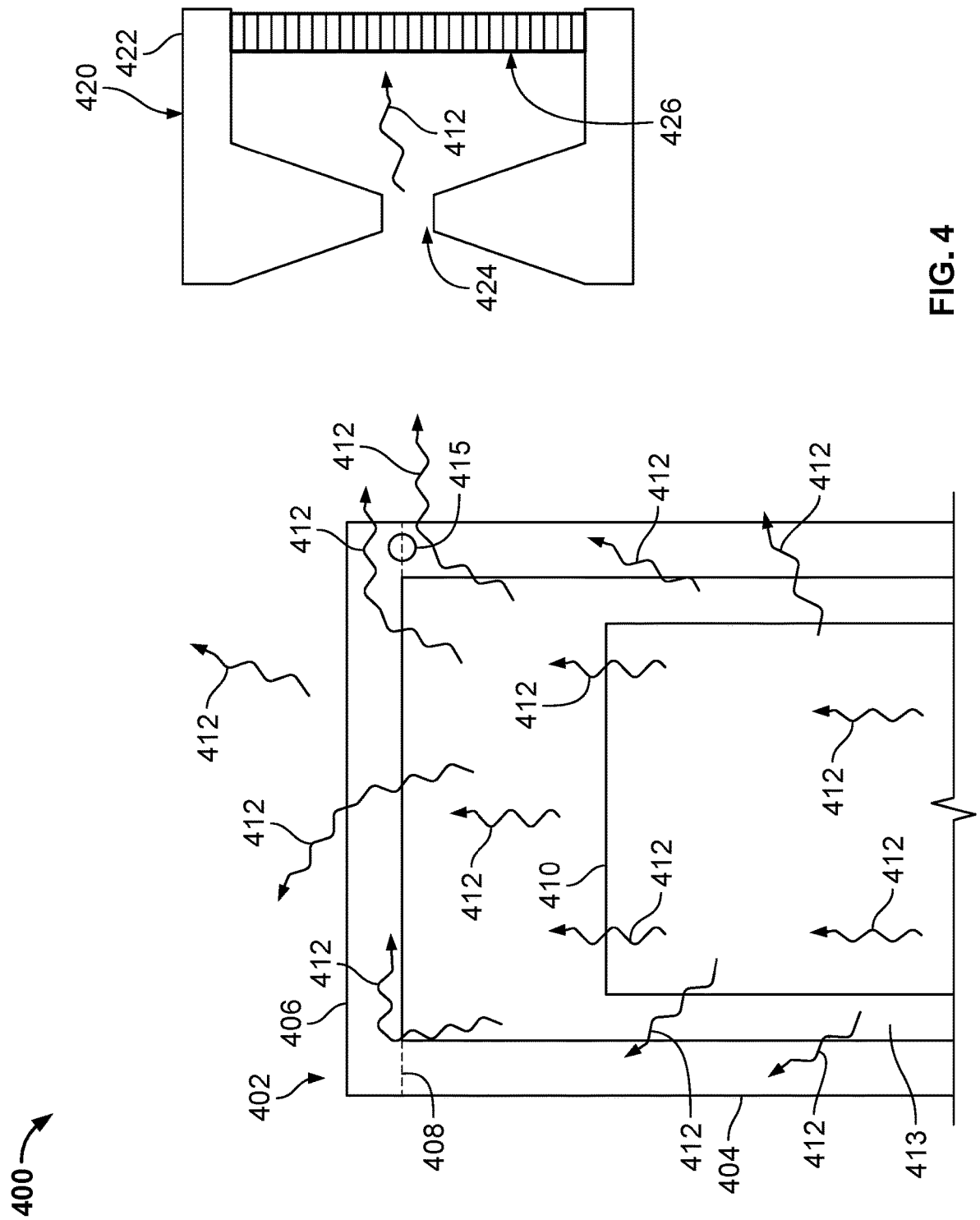
FIG. 4-8 are schematic illustrations of example implementations of a hazardous material canister according to the present disclosure.

The nuclear waste emits gamma and X-radiation, making the close environment of the canister dangerous for humans. However, such nuclear waste needs to be sealed within the canister, such as by welding a top or seal onto the open canister to seal the nuclear waste within a volume of the canister For example, FIG. 4 shows an example system 400 for examining and validating a weld 408 formed on a hazardous material canister 402, e.g., to join a cap 406 of the hazardous material canister 402 to a housing 404 of the hazardous material canister 402. Conventional methods have been used in the past to validate the quality of such welds. Certain methods are non-destructive. These include visual inspection, ultrasonics, and gamma ray radiography. Radiography typically consists of putting a source of X-rays or gamma rays near the weld and recording the transmitted rays. Any hidden gap or void in the weld would transmit gamma (and/or X-) rays at an increased level.

The example system 400 (and method of operating the system 400) utilizes gamma ray emission (shown as 412) of radioactive (or nuclear) waste 410 (e.g., SNF or high level waste) as the source of the radiation used to probe the weld 408. In some aspects, the term "gamma ray" includes both gamma rays and X-rays. The gamma rays 412, during inspection of the weld 408, may not be viewed directly. However, gamma rays 412 are not only absorbed, but also scattered. That is, a gamma ray hitting the nucleus of an atom, or an electron, can be deflected so that it travels in a different direction. This usually involves energy loss of the gamma ray 412, but for the present disclosure, the energy loss is small enough that the deflected ray is still considered to be a gamma ray 412. In some aspects, these scattered gamma rays 412 may be used to examine the quality of the weld 408, in particular, whether there are any gaps or voids 415 within the weld 408 that seals the nuclear waste 410 within a volume 413 defined within the housing 404.

For an example, a flat weld 408 may be formed that connects the canister housing 404 with the canister lid 406 (e.g., by spin welding). FIG. 4 shows an example implementation of a portion of the hazardous material canister 402 in a vertical orientation. The weld 408 may be horizontal, as shown with the dashed lines in FIG. 4. Also, the dashed lines may show where the lid 406 of the canister 402 and the housing 404 of the canister 402 meet (i.e., at the weld 408). In some aspects, a cross section of the canister 402 taken at the weld 408 is circular. Thus, the weld 408 itself may be a circular weld that joins adjoining circumferential edges of the housing 404 and the lid 406 of the canister 402. In some aspects, at least one of the housing 404, lid 406, or weld 408 are made of a corrosion-resistant alloy, such as Alloy 625.

As shown in FIG. 4, the highly radioactive material 410 is emplaced in the volume 413 of the canister 402 below the weld 408. The radioactive material 410 (e.g., nuclear waste) emits gamma and X-rays (shown collectively as 412) in all directions. The gamma rays of interest are those that are emitted in a generally upward direction, and which paths cross the weld 408 to be examined.

When the source of gamma rays 412 is sufficiently high, an image of the source distribution can be obtained by using a gamma ray camera 420 that includes a shield 422 (e.g., a lead shield) with one or more openings 424. For example, as shown, the shield 422 may have a single small opening 424 and a gamma ray detector 426 positioned behind the hole 424 (e.g., opposite the canister 402). For example, as shown in FIG. 4, the gamma ray, or "pinhole," camera 420 is positioned so as to receive gamma rays 412 that potentially exit the sealed canister 402 through one or more voids 415 in the welded portion 408, through the pinhole 424, and at the gamma ray image detector 426.

In an alternative aspect, the pinhole 424 may be a horizontal slit. A horizontal slit may admit more gamma rays 412, but the slit provides no horizontal resolution, which is not needed if the goal is to validate a thin horizontal weld (such as weld 408). The validation of the weld 408 may include testing if the layer of the weld scatters as many gamma rays 412 as do the layers of the housing 404 and/or lid 406 (e.g., above the weld 408 or below the weld 408). If the scattering is the same or substantially the same, then it indicates that there are no voids 415 in the weld 408.

In further alternative aspects, the gamma ray camera 420 comprises an Anger camera or a coded aperture camera. For example, as an Anger camera, the gamma ray camera 420 includes a series of holes in a gamma absorber such as lead.

In this example implementation, the gamma ray camera 420 operates to provide pinhole imaging of scattered radiation 412; the presence of a void 415 in the weld 408 creates a region in an image created by the gamma ray image detector 426 with less exposure. Thus, the pinhole camera 420 images any voids 415 as a "dark" region, i.e., one with fewer gamma rays 412 being received from the nuclear waste 410 in the canister 402.

The pinhole camera 410, as shown, for example, is used in gamma ray radiography of the hazardous material canister 402 in combination with the stored radioactive waste 410 as the source of the gamma rays 412 used to verify the integrity of the weld 408. For example, aspects of the present disclosure include the pinhole camera 420 to measure scattered radiation (e.g., gamma rays 412) emitted naturally from within the canister 402 (e.g., by the enclosed nuclear waste 410) with no need to add an additional source. Thus, aspects of the present disclosure include a source of the gamma rays 412 used to measure or determine an integrity of the weld 408 that seals nuclear waste 410 in the canister 402 that is the nuclear waste 410, itself.

In some aspects, one or both of the nuclear waste canister and the gamma ray image detector are rotated during the operation of the detector to receive scattered gamma rays and generate an image of the received gamma rays. Thus, in some aspects, the gamma ray image detector may operate to inspect a complete circumference of the weld as the detector or the canister (or both) rotates (e.g., around 360 degrees).

A controller, control system, or computing system (e.g., control system 900) may be connected to the gamma ray image detector 426 and/or the gamma ray camera 420 to receive images from the detector 426. The images show, for example, the scattered radiation that shows the presence of any void in the weld 408. Based on the image, the computing system 900 may determine an integrity of the weld 408. For example, the computing system 900 may determine that the images include portions that show voids of a particular size that indicates that the weld 408 is not sufficient to seal the radioactive waste 410 in the hazardous material canister 402.

Figure 5:
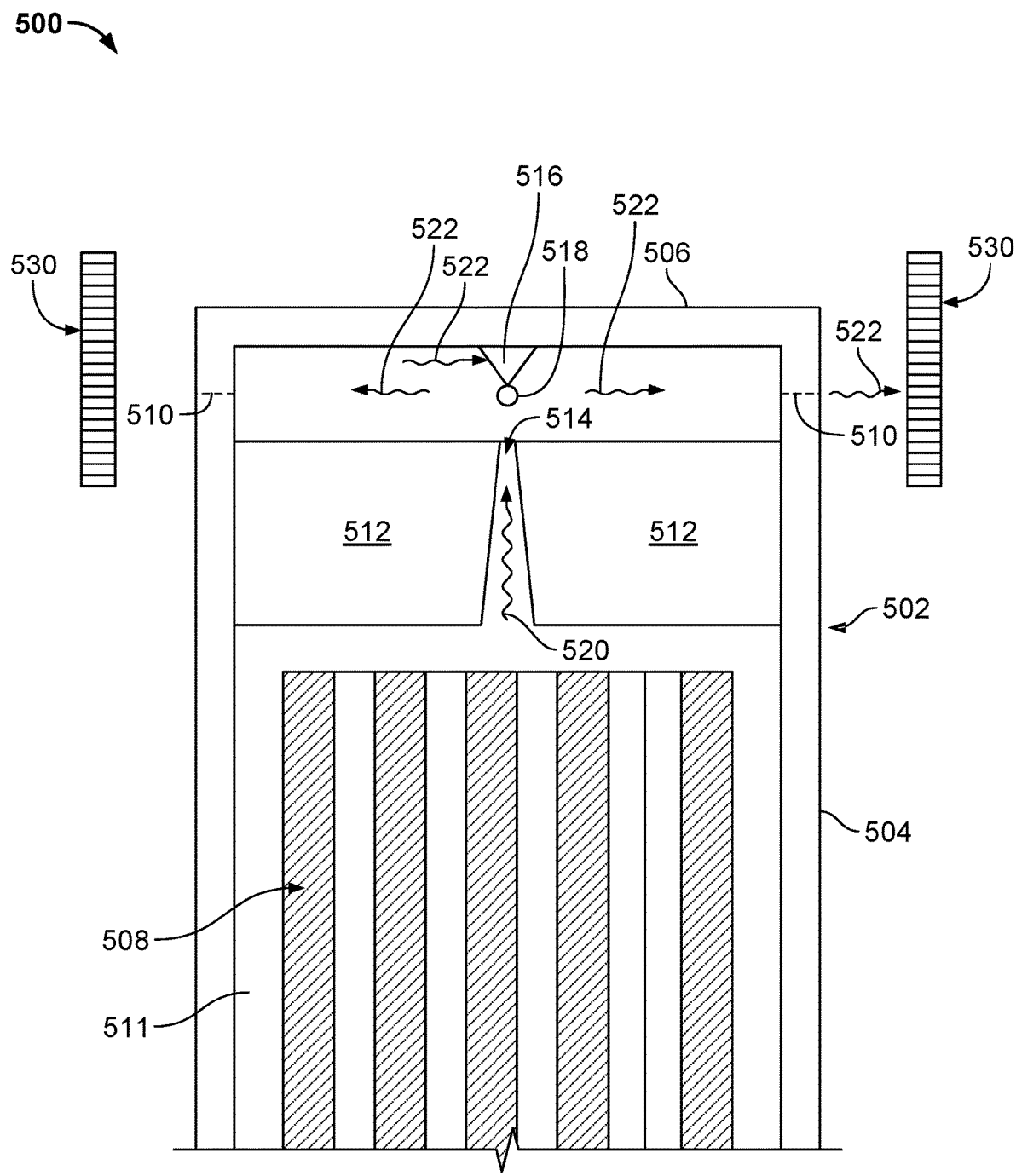

Turning to FIG. 5, this figure illustrates an example system 500 for examining and validating a weld 510 formed on a hazardous material canister 502, e.g., to join a cap 506 of the hazardous material canister 502 to a housing 504 of the hazardous material canister 502. Conventional methods have been used in the past to validate the quality of such welds. Certain methods are non-destructive. These include visual inspection, ultrasonics, and gamma ray radiography. Radiography typically consists of putting a source of X-rays or gamma rays near the weld and recording the transmitted rays. Any hidden gap or void in the weld would transmit gamma (and/or X-) rays at an increased level.

In this example, the canister 502 includes the lid 506, which is sealed to the housing 504 of the canister 502 by a weld 510 (e.g., by spin welding). For instance, example implementations utilize a spin welding system is used to attach the lid 506 to the housing 504 of FIG. 5 (e.g., through the technique of spin welding). Further, in some aspects, implementations of FIG. 5 include a shield 512 (lead or other material that absorbs gamma rays) that is placed within a volume 511 of the canister 502 to prevent gamma rays 520 from the radioactive waste 508 from reaching one or more gamma ray detectors 530, but low enough that the shield 512 does not interfere with the imaging of the weld 510. If the weld 510 is created through spin welding, then a region to be examined by the gamma ray detectors 530 can be no more than one or several millimeters in vertical extent. If this is the case, then the shield 512 may cover most of the canister 502. As another example, a shield made from tungsten or tungsten carbide could be used. The shield 512 could also be made of a material such as sand (or tungsten carbide) that is packed in at the top part of the canister 502.

The example system 500 (and method of operating the system 500) utilizes gamma ray emission (shown as 520) of radioactive (or nuclear) waste 508 (e.g., SNF or high level waste) as the source of the radiation used to probe the weld 510. In some aspects, the term "gamma ray" includes both gamma rays and X-rays.

As shown, a flat weld 510 may be formed that connects the canister housing 504 with the canister lid 506 (e.g., by spin welding). FIG. 5 shows an example implementation of a portion of the hazardous material canister 502 in a vertical orientation. The weld 510 may be horizontal, as shown with the dashed lines in FIG. 5. Also, the dashed lines may show where the lid 506 of the canister 502 and the housing 504 of the canister 502 meet (i.e., at the weld 510). In some aspects, a cross section of the canister 502 taken at the weld 510 is circular. Thus, the weld 510 itself may be a circular weld that joins adjoining circumferential edges of the housing 504 and the lid 506 of the canister 502. In some aspects, at least one of the housing 504, lid 506, or weld 510 are made of a corrosion-resistant alloy, such as Alloy 625.

As shown in FIG. 5, the highly radioactive material 508 is emplaced in the volume 511 of the canister 502 below the weld 510. The radioactive material 508 (e.g., nuclear waste) emits gamma and X-rays (shown collectively as 520) in all directions. The gamma rays of interest are those that are emitted in a generally upward direction through an aperture 514 of the shield 512 toward the scatterer 516.

In this example, a scatterer is positioned near or attached to an inner surface of the cap and aligned with the small hole in the shield. In this example, gamma ray radiation is caused to scatter by the scatterer so that the radiography of the weld is essentially a shadow image.

In this example implementation shown in FIG. 5, the gamma shield 512 is placed above the nuclear material 508 but below the weld 510. The shield 512 reduces upward gamma rays 520, and attenuates the number of gamma rays 522 that can travel directly to the gamma ray imaging detector 530 from the nuclear material 508. For example, gamma rays 520 emitted by the nuclear material 508 pass through the aperture 514 in the radial middle of the shield 512 and hit a point 518 of the scatterer 516. The aperture 514 could be open or filled with any material that does not strongly absorb gamma radiation. The point 518 of the scatterer 516, in some examples, is a small sphere or disk of material that strongly scatters gamma rays 520 (to scattered gamma rays 522); an example is tungsten or tungsten carbide or tungsten carbide cobalt. The gamma rays 522 scatter off the point 518 in all directions, which gives the scatterer 516 the effect of being a point source of gamma rays 522. Some of these rays 522 pass through the weld 510 and the parts of the canister 502 near the weld 510 onto the gamma imaging detector 530 (e.g., a piece of film, as is often used for dental X-rays, or an array of gamma detectors). A shadow of the weld 510 on the imaging detector 530 reveals any gaps or discontinuities (e.g., voids) in the weld 510. The shield 512 may also act to limit the number of gamma rays 520 that emerge from the lid 506 of the canister 502.

In some aspects, the gamma shield 512 serves other additional purposes. For example, if the canister 502 is placed in an external radiation shield without a lid (as may be done when the canister 502 is sitting above a directional drillhole prior to being lowered into the hole), then a top of the external radiation shield can be open, since most of gamma rays 520 in the upward direction is absorbed by the shield 512. Also, the shield 512 may reduce an amount of gamma radiation 520 that travels directly from the radioactive waste 508 to hit the imaging device 530; such direct radiation, if not attenuated, would create a background "fogging" that could obscure the shadow image. Further, due to the aperture 514 in the shield 512, gamma rays 520 impinge on the point 518 of the scatterer 516 to provide a "point-like" source for the shadow radiography. The shield 512 also absorbs most of the upward traveling gamma rays 520, thus providing radiation shielding in the upward direction (e.g., from the volume 511 toward the lid 506).

Continuing with FIG. 5, the shield 512 may also provide an internal radiation shield that may ease handling of the canister 502 and allows the weld 510 to be made with a lid 506 that does not have an external radiation shield attached. Further, the gamma shield 512 is placed below the weld 510 and is thus in a relatively low gamma ray environment, which facilities radiography of the weld 510. Further, the shield 512 includes the aperture 514 that allows gamma rays 520 to hit the point 518 of the scatterer 516 that is positioned at the same or close to same planar location as the weld 510. Scattering from this point 518 provides a point-like source of gamma rays 522 for the weld 510, which then can be examined by using shadow imaging.

In an example operation of the system 500, gamma rays 520 emitted by the nuclear material 508 pass through the aperture 514 in the radial middle of the shield 512 and hit the point 518 of the scatterer 516. The gamma rays 522 scatter off the scatterer 516 in all directions, which gives the scatterer 516 the effect of being a point source of gamma rays 522. Some of these rays 522 pass through the weld 510 onto the gamma imaging detector 530. The shadow of the weld 510 on the imaging detector 530 will reveal any gaps or discontinuities in the weld 510.

When the source of gamma rays 522 is sufficiently high, an image of the source distribution can be obtained by using a gamma ray camera (such as camera 420) that includes a shield (e.g., a lead shield) with one or more openings. For example, as shown for camera 420 (which can be used in system 500 and includes gamma ray detectors 530), the shield may have a single small opening and gamma ray detector 530 positioned behind the hole (e.g., opposite the canister 502). For example, much like as shown in FIG. 4, a gamma ray, or "pinhole," camera is positioned so as to receive gamma rays 522 that potentially exit the sealed canister 502 through one or more voids in the welded portion 510, through the pinhole, and at the gamma ray image detector 530.

The validation of the weld 510 may include testing if the layer of the weld scatters as many gamma rays 522 as do the layers of the housing 504 and/or lid 506 (e.g., above the weld 510 or below the weld 510). If the scattering is the same or substantially the same, then it indicates that there are no voids in the weld 510.

In some aspects, one or both of the hazardous material canister 502 and the gamma ray image detector 530 are rotated during the operation of the detector 530 to receive scattered gamma rays 522 and generate an image of the received gamma rays 522. Thus, in some aspects, the gamma ray image detector 530 may operate to inspect a complete circumference of the weld 510 as the detector 530 or the canister 502 (or both) rotates (e.g., around 360 degrees). A controller, control system, or computing system (e.g., control system 900) may be connected to the gamma ray image detector 530 and/or a gamma ray camera to receive images from the detector 530. The images show, for example, the scattered radiation that shows the presence of any void in the weld 510. Based on the image, the computing system 900 may determine an integrity of the weld 510. For example, the computing system 900 may determine that the images include portions that show voids of a particular size that indicates that the weld 510 is not sufficient to seal the radioactive waste 508 in the hazardous material canister 502.

Figure 6:
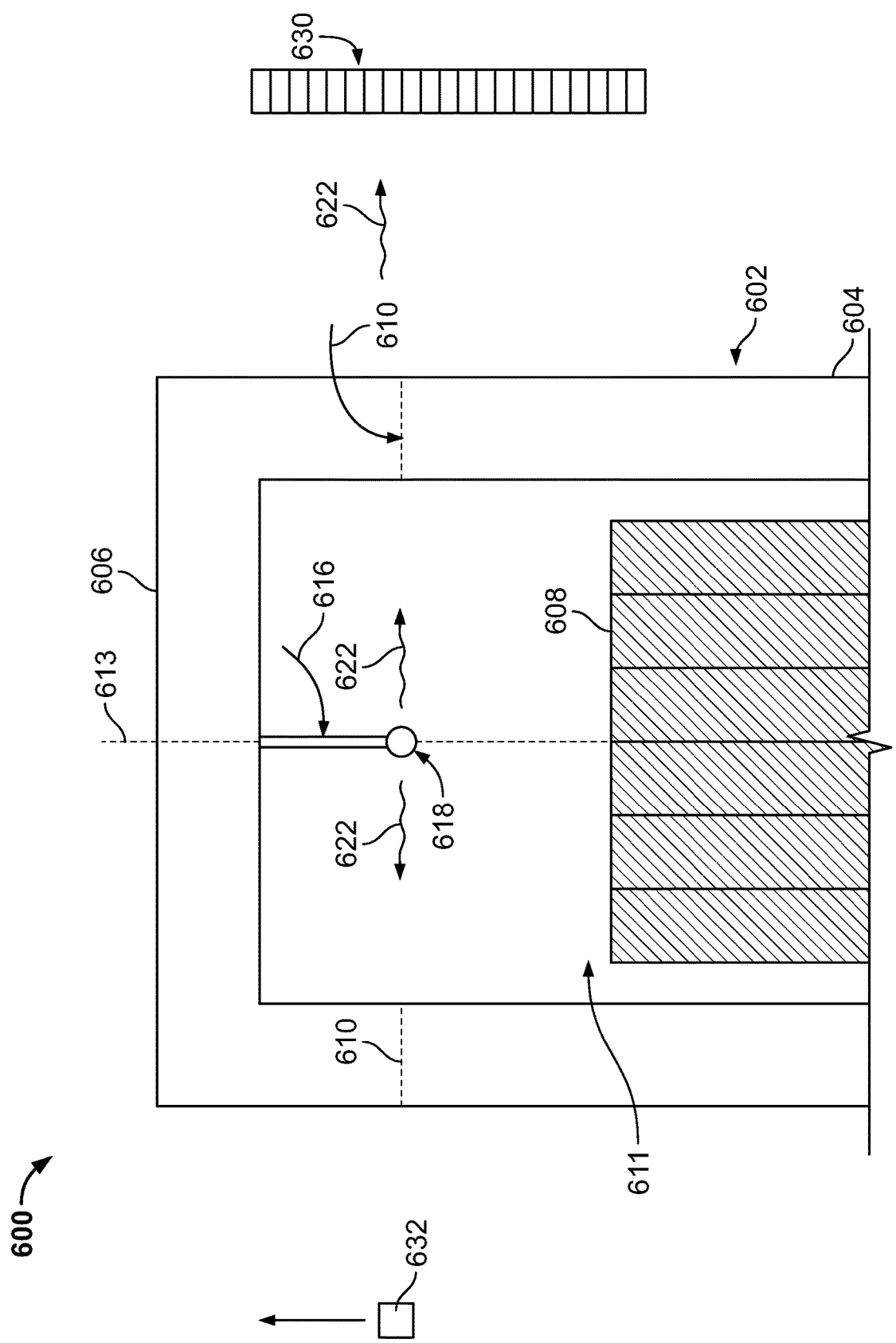

Turning to FIG. 6, this figure illustrates an example system 600 for examining and validating a weld 610 formed on a hazardous material canister 602, e.g., to join a cap 606 of the hazardous material canister 602 to a housing 604 of the hazardous material canister 602. Conventional methods have been used in the past to validate the quality of such welds. Certain methods are non-destructive. These include visual inspection, ultrasonics, and gamma ray radiography. Radiography typically consists of putting a source of X-rays or gamma rays near the weld and recording the transmitted rays. Any hidden gap or void in the weld would transmit gamma (and/or X-) rays at an increased level.

In this example, the canister 602 includes the lid 606, which is sealed to the housing 604 of the canister 602 by a weld 610 (e.g., by spin welding). For instance, example implementations utilize a spin welding system is used to attach the lid 606 to the housing 604 of FIG. 6 (e.g., through the technique of spin welding). Further, as shown, the hazardous material canister 602 includes a gamma ray source 618 located within a volume 611 of the canister 602 to create gamma rays 622 that pass through the weld 610 in a gamma ray radiography analysis. In some aspects, the gamma ray source 618 is a radioactive material (that is in addition to the radioactive nuclear waste 608 disposed in the canister 602) in a particular location within the volume 611 of the canister 602. In some aspects, the particular location of the radioactive material 618 may be centered in the inner volume 611 of the canister 602 near the lid 606 of the canister 602 (as shown in FIG. 6). In some situations, having the radioactive source 618 internal to, rather than external of, the canister 602, can have substantial handling and safety advantages.

In some aspects, the radioactive material 618 may be connected to a support 616 that is, in turn, connected to the lid 606 (or other part of the canister 602). The radioactive material 618, in some aspects, may be americium-241 (Am-241) that can be used to generate gamma rays 622 that are then utilized to inspect and validate the quality of the weld 610 or other material (e.g., a corrosion-resistant alloy such as Alloy 625 placed by three-dimensional (3D) printing) that attaches the lid 606 to the housing 604 of the canister 602.

As shown in FIG. 6, the radioactive material 618 may be a physically small (but, in some aspects, highly radioactive) source on a radial centerline axis of the canister 602 at the same vertical level (as shown, the is canister oriented vertically) as the lid/canister seal (i.e., the weld 610 shown by a dotted line in this figure). As noted, one example source may be americium-241, which has a half-life of 4.6 years. This relatively short half-life means that the radioactive material 618 can be small and yet emit a large rate of gamma rays 622. Americium-241 also emits a relatively low energy 59.5 keV gamma ray. This low energy is well-matched to the need to examine a relatively thin (e.g., 0.5 cm) canister weld 610. Many other gamma sources could be used, including Co-60, Cs-137, Ba-137, Ir-192, and Na-22.

An example of placement of the gamma source is shown in FIG. 6. In this figure, the canister 602 is shown with a radial axis of symmetry 613 (shown with a dashed line) in a vertical orientation. The small Am-241 gamma source 618 is attached (e.g., permanently) to the lid 606 of the canister 602 prior to welding (or sealing). The source 618 may be held in place by a support structure 616. In FIG. 6, the support structure 616 is a narrow rod but can also be a larger cylinder or other shape. In an example implementation, the source 618 is positioned in the same radial plane of the weld 610, although it could be at a different location.

In an example operation of the system 600, gamma rays 622 emitted by the radioactive source 618 scatter in all directions. Some of these rays 622 pass through the weld 610 onto a gamma ray image detector 630 (e.g., as an array of detectors as part of a gamma ray camera) and/or a single gamma ray image detector 632 (also as part of a gamma ray camera). The shadow of the weld 610 on the imaging detector 630 will reveal any gaps or discontinuities in the weld 610. An image of the source distribution can be obtained by using a gamma ray camera (such as camera 420) that includes a shield (e.g., a lead shield) with one or more openings. For example, as shown for camera 420 (which can be used in system 600 and includes gamma ray detectors 630), the shield may have a single small opening and gamma ray detector 630 positioned behind the hole (e.g., opposite the canister 602). For example, much like as shown in FIG. 4, a gamma ray, or "pinhole," camera is positioned so as to receive gamma rays 622 that potentially exit the sealed canister 602 through one or more voids in the welded portion 610, through the pinhole, and at the gamma ray image detector 630.

The validation of the weld 610 may include testing if the layer of the weld scatters as many gamma rays 622 as do the layers of the housing 604 and/or lid 606 (e.g., above the weld 610 or below the weld 610). If the scattering is the same or substantially the same, then it indicates that there are no voids in the weld 610.

In some aspects, one or both of the hazardous material canister 602 and the gamma ray image detector 630 are rotated during the operation of the detector 630 to receive gamma rays 622 and generate an image of the received gamma rays 622. Thus, in some aspects, the gamma ray image detector 630 may operate to inspect a complete circumference of the weld 610 as the detector 630 or the canister 602 (or both) rotates (e.g., around 360 degrees). A controller, control system, or computing system (e.g., control system 900) may be connected to the gamma ray image detector 630 and/or a gamma ray camera to receive images from the detector 630. The images show, for example, the scattered radiation that shows the presence of any void in the weld 610. Based on the image, the computing system 900 may determine an integrity of the weld 610. For example, the computing system 900 may determine that the images include portions that show voids of a particular size that indicates that the weld 610 is not sufficient to seal the radioactive waste 608 in the hazardous material canister 602.

In aspects that utilize a moving gamma detector (630 or 632), the motion may be relative (i.e., not absolute). In some aspects, therefore, the canister 602 may be rotated rather than the detector 630. If the single gamma ray detector 632 is utilized, and the radioactive source 618 acts as a point source, then only one point on the canister 602 will be imaged at any one time. If the detector 632 is extended in the horizontal direction then a horizontal section of the canister 602 can be observed.

In some aspects, the gamma ray detector 632 (or detectors 630) may determine the energy of the observed gamma rays 622. If this is done, then extraneous gammas (from, for example, the nuclear waste 608) can be discriminated against. For example, while not shown in the FIG. 6, a shield (lead or other material that absorbs gamma rays) can be placed around the housing 604 of the canister 602 to prevent gamma rays from the nuclear waste 608 from reaching the detectors 630 (or 632). Any shield placed around the housing 604, however, would be low enough such that the shield does not interfere with the imaging of the weld 610 (i.e., interfere with gamma rays 622 from the radioactive source 618). If the weld 610 is created through spin welding, then the region to be examined may be no more than one or several millimeters in vertical extent. If this is the case, then the shielding may cover most of the housing 604 of the canister 602. As another example, a shield made from tungsten or tungsten carbide could be used. The shield could also be made of a material such as sand (or tungsten carbide) that is packed in at the top part of the canister 602.

In an alternative implementation, the radioactive source 618 may be a flat, thin disk located at the same or similar vertical height (and radial plane) as the weld 610. This thin disk provides a shadow with variating resolution; the highest resolution would be at the height of the weld 610. Any void at the weld height may be observed with no need for de-blurring. This alternative configuration offers the capability of maximum resolution at the desired inspection location, while allowing a more intense (i.e., larger) radioactive source 618 to be used.

A controller, control system, or computing system (e.g., control system 900) may be connected to the gamma ray image detector 630 and/or a gamma ray camera to receive images from the detector 630. The images show, for example, the scattered radiation that shows the presence of any void in the weld 610. Based on the image, the computing system 900 may determine an integrity of the weld 610. For example, the computing system 900 may determine that the images include portions that show voids of a particular size that indicates that the weld 610 is not sufficient to seal the radioactive waste 608 in the hazardous material canister 602.

Figure 7:
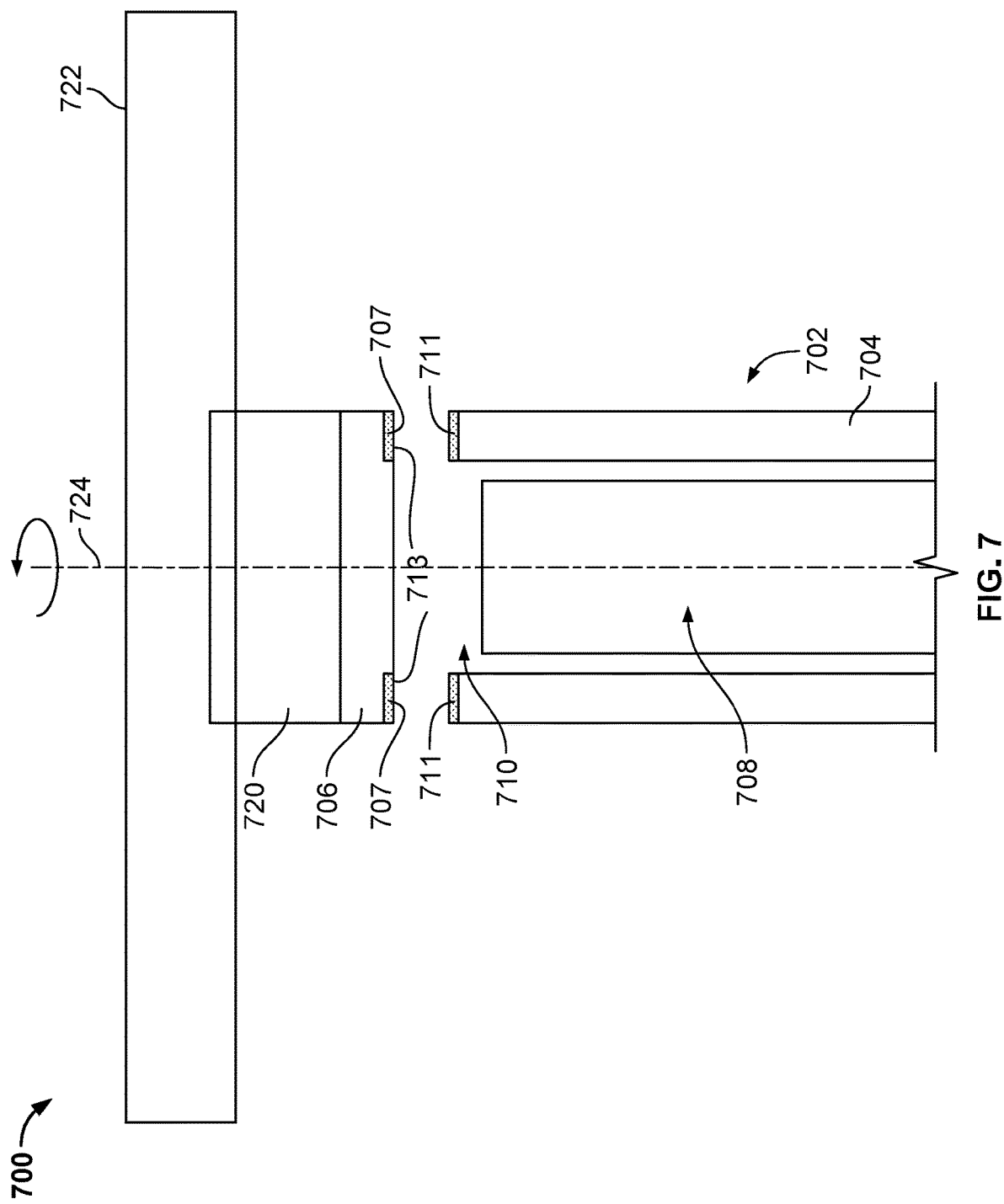

Turning to FIG. 7, this figure shows an example implementation of a system 700 for sealing a hazardous material canister 702 by welding, and more specifically, spin welding, a lid 706 of the canister 702 to a housing 704 of the canister 702. As shown in this example implementation, radioactive waste (or material) 708, e.g., nuclear waste 708, is emplaced in a volume 710 of the housing 704 of the hazardous material canister 702. The nuclear waste 708, in some aspects, includes SNF (such as a SNF assembly or portion thereof) or high level waste. For instance, after SNF or high level waste is loaded into the hazardous material canister 702, the canister 702 must be closed and sealed in order to prevent any potential leakage paths or radioactive waste leaks from the radioactive waste 708. Further, possible pathways that could speed a corrosion path from the outside to the volume 710 of the canister 702 should be avoided. In some aspects, the lid 706 to the canister 702 is welded in place to seal the SNF (or high level nuclear waste) within the canister 702. The weld should be of high quality and offer protection against corrosion that is equally as good as that of the material of the canister 702 (e.g., a corrosion resistant alloy such as CRA 625). In some aspects, welding is very difficult to achieve in a high radiation environment. The canister 702 contains radioactive material 708 that emits high fluxes of gamma rays and X rays (collectively, "gamma rays"). In some aspects, the weld must satisfy the stringent criteria of the Nuclear Regulatory Commission. The weld is inspected to assure that it has this quality.

The system 700 of FIG. 7 (and methods performed by or with the system 700) seals the hazardous material canister 702 through the preparation of the housing 704 and the lid 706 and the application of spin (or friction) welding the lid 706 onto the housing 704 of the canister 702 into which the nuclear waste 708 is enclosed and then sealed (e.g., by the spin welding of the lid 706 onto the housing 704). An example implementation is shown in FIG. 7, which includes a cross-sectional view (vertical) of the canister housing 704, the lid 706, and a flywheel 722, which may be used in some aspects to rotate or oscillate the lid 706 about an axis of rotation 724 during the welding process. The flywheel 722 and an optional shield 720 may be part of a spin welding system used to attach the lid 706 to the housing 704 of FIG. 7.

For example, in some aspects, an open edge 711 of the housing 704 (e.g., the circumferential edge 711 of the housing 704 of the canister 702 in the case of a cylindrical housing) is polished to make a flat and clean surface. A circumferential edge 707 of the lid 706 is similarly prepared. The lid 706 is then pressed onto the housing 704 (at the open edge 711) and rotated (or in alternative implementations, oscillated). Friction generated between the two circumferential edges 711 and 707 (of the housing 704 and the lid 706) creates a weld 713. In some aspects, no additional metal needs be added to form the weld 713.

In an example operation, the canister 702 is set vertically with the flat polished end 711 facing upward. The lid 706 is placed vertically above the open housing 704 of the canister 702 after the nuclear waste 708 has been inserted and held tightly by, e.g., the flywheel 722, and made to spin. The lid 706 and flywheel 722 would then be lowered to make contact between the lid 706 and the top circumferential edge 711 of the housing 704. The flywheel 722 could be released, so that the weight of the flywheel 722 would press the two polished surfaces 711 and 707 together. Friction causes the flywheel 722 to gradually slow its rotation, and simultaneously, the friction heats the polished flat surfaces 711 and 707 of both the housing 704 and the lid 706, heating them to a particular welding temperature (e.g., based on the material of the housing 704 and lid 706). When the spin rotational rate decreases to zero, the lid 706 and the canister 702 are welded together. Then, the flywheel 722 can be removed and the weld 713 is made to sealingly enclose the nuclear waste 708 within the canister 702.

In some aspects, the polished surfaces 711 and/or 707 may be configured in opposing male and female surfaces to better create a strong seal with the weld 713. In some aspects, the polished surfaces 711 and/or 707 could be flat on average, but have an undulating up-and-down surface to better create a strong seal with the weld 713. As another example, the shield 720 may comprise a gamma ray shield that sits on top of the lid 706 (e.g., between the lid 706 and the flywheel 722) to, e.g., aid in transport of the canister 702. The shield 720 may be spun (e.g., by the flywheel 722) during welding or the shield 720 may be attached to the lid 706 after the lid 706 has been welded to the housing 704 of the canister 702.

Although the system 700 shown in FIG. 7 includes the flywheel 722, alternative implementations do not include the flywheel 722. For example, a spin welding system may force the lid 706 onto the housing 704 while causing relative motion therebetween to result in friction to enable the weld 713 without the use of the flywheel 722. Further, as noted, spin motion (e.g., repeated 360° rotation) is also not essential. In some aspects, a back-and-forth oscillation between the lid 706 and the housing 704 may be utilized to form the weld 713.

In some aspects, the described example operation of the system 700 can be done remotely without a nearby presence of humans (who would be endangered by the gamma rays). Further, in some aspects, no additional material (e.g., filler material) is used for the weld 713; only the material of which the canister housing 704 and lid 706 is needed to create the weld 713. In some aspects, the lid 706 and the housing 704 may both be made of corrosion-resistant metal alloys. One such choice for an alloy would be Alloy-625 (CRA 625). As another example, such material may facilitate flat, clean surfaces that lead to high quality welds with little to no microscopic gaps and voids. As another example, a flat weld between the lid 706 and the canister housing 704 may be particularly amenable to inspection to verify that the seal is complete and there are not gaps or voids. This can be done either by using hypersonic probing or by using radiological methods (e.g., as described with reference to FIGS. 4-6).

Figure 8:
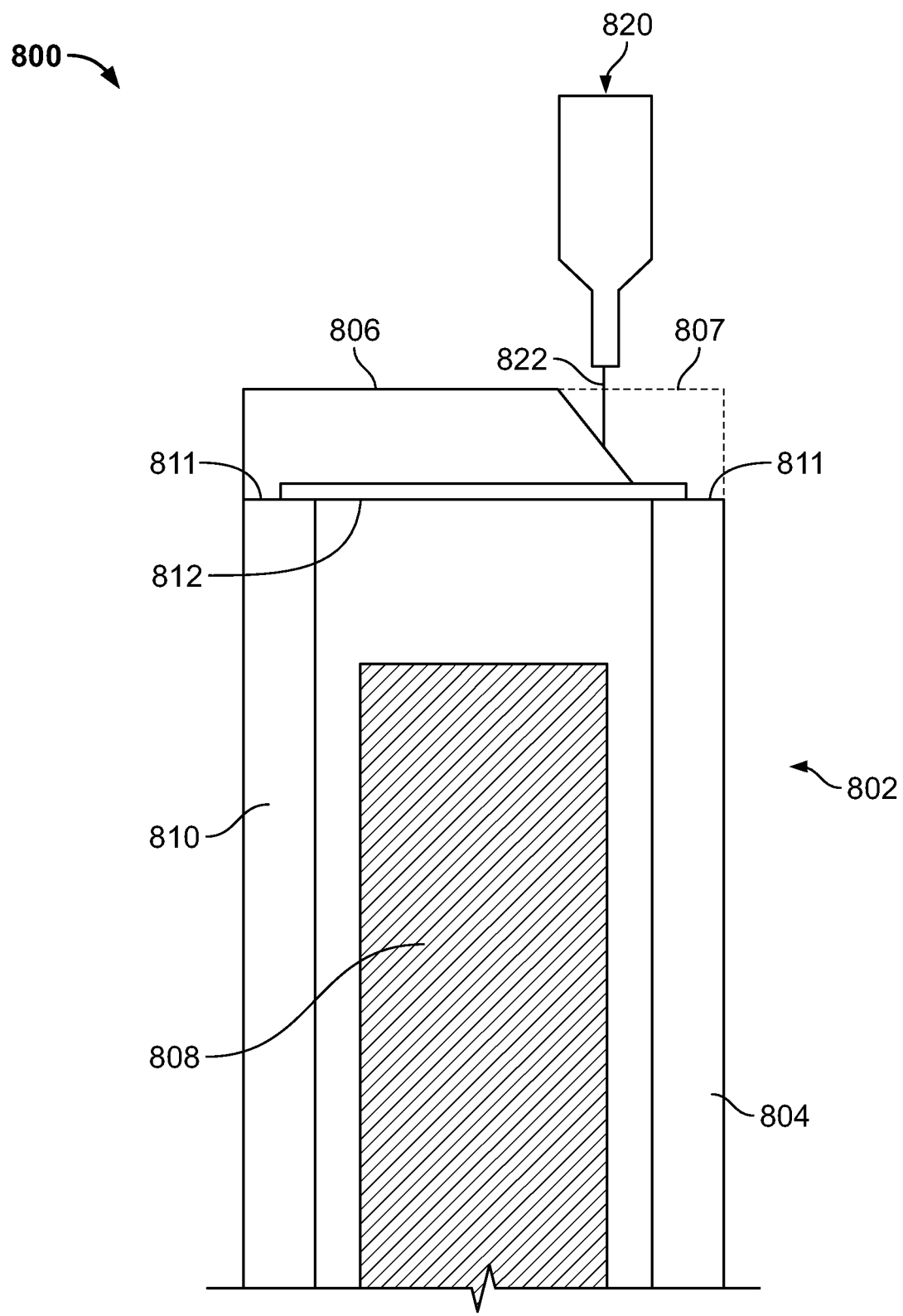

Turning to FIG. 8, this figure shows an example implementation of a system 800 for sealing a hazardous material canister 802 by sealing a housing 804 of the canister 802 to enclose radioactive waste 808 within a volume 810 of the canister 802 with a material deposition system 820. As shown in this example implementation, radioactive waste (or material) 808, e.g., nuclear waste 808, is emplaced in the volume 810 of the housing 804 of the hazardous material canister 802. The nuclear waste 808, in some aspects, includes SNF (such as a SNF assembly or portion thereof) or high level waste. For instance, after SNF or high level waste is loaded into the hazardous material canister 802, the canister 802 must be closed and sealed in order to prevent any potential leakage paths or radioactive waste leaks from the radioactive waste 808. Further, possible pathways that could speed a corrosion path from the outside to the volume 810 of the canister 802 should be avoided. In some aspects, a cap 806 is formed on and sealed to the housing 804 by the 3D printing system 820 to seal the SNF (or high level nuclear waste) within the canister 802. The seal should be of high quality and offer protection against corrosion that is equally as good as that of the material of the canister 802 (e.g., a corrosion resistant alloy such as CRA 625). In some aspects, sealing or welding is very difficult to achieve in a high radiation environment. The canister 802 contains radioactive material 808 that emits high fluxes of gamma rays and X rays (collectively, "gamma rays"). In some aspects, the seal must satisfy the stringent criteria of the Nuclear Regulatory Commission. The seal is inspected to assure that it has this quality.

As shown, FIG. 8 shows the example system 800 (and methods performed by or with the system 800) to enclose the nuclear waste 808 in the hazardous material canister 802 by the direct material (e.g., metal) deposition system 820, e.g., a 3D printing system. In some aspects, direct material deposition may have advantages over welding. Thus, described implementations include a method of forming and attaching a lid 806 to the housing 804 of the hazardous material canister 802 that contains radioactive (or other toxic) material 808. In some aspects, the canister 802 (e.g., the housing 804 and/or the lid 806) may be made of a corrosion-resistant alloy, such as Alloy-625. Such an alloy can also be used as a material 822 for the direct material deposition system 820. Thus, the system 800 may be used in one or more example operations for building the lid 806 for the canister 802 made in-place (through direct material deposition) once the housing 804 has been filed with the radioactive material 808.

In the example system 800 shown in FIG. 8, a sub-lid 812 may be placed on an open end 811 of the housing 804 (through which the nuclear waste 808, such as SNF assemblies, is inserted into the volume 810 of the canister 802). In this example, the sub-lid 812 is also made of Alloy-625, but it could be made of a different metal (e.g., corrosion resistant alloy or other metal). In some aspects, the sub-lid 812 may be made of a material that prevents gamma rays from passing therethrough (e.g., a gamma ray shield). In some aspects, the sub-lid 812 may not provide a seal to the housing 804 by itself, but may provide a platform on which the cap 806 is deposited by the system 820 and formed. The sub-lid 812, in some aspects, may be relatively thin (as shown) or it could be thick (e.g., relative to a thickness of the canister housing 804 or the lid 806 formed on the canister housing 804 by the direct material deposition system 820).

In an example operation of the system 800, the lid 806 is constructed (e.g., to a particular thickness) using the direct material deposition system 820. In this example, the direct material deposition system 820 may be a 3D printer. For example, a print head of the 3D printer moves over a top surface of the sub-lid 812 and the open end edge 811 of the housing 804 to deposit material 822 (e.g., corrosion resistant alloy droplets (such as Alloy-625)), which may be liquid or semi-solid. As shown in FIG. 8, part way through the complete example operation, the lid 806 is partially formed, with a remaining portion 807 of the lid 806 shown in dashed line (to be completed). By moving the print head over these surfaces, the full lid 806 is made and sealed to the housing 804. The lid 806, once formed, seals the nuclear waste 808 in the volume 810 of the canister 802.

Figure 9:
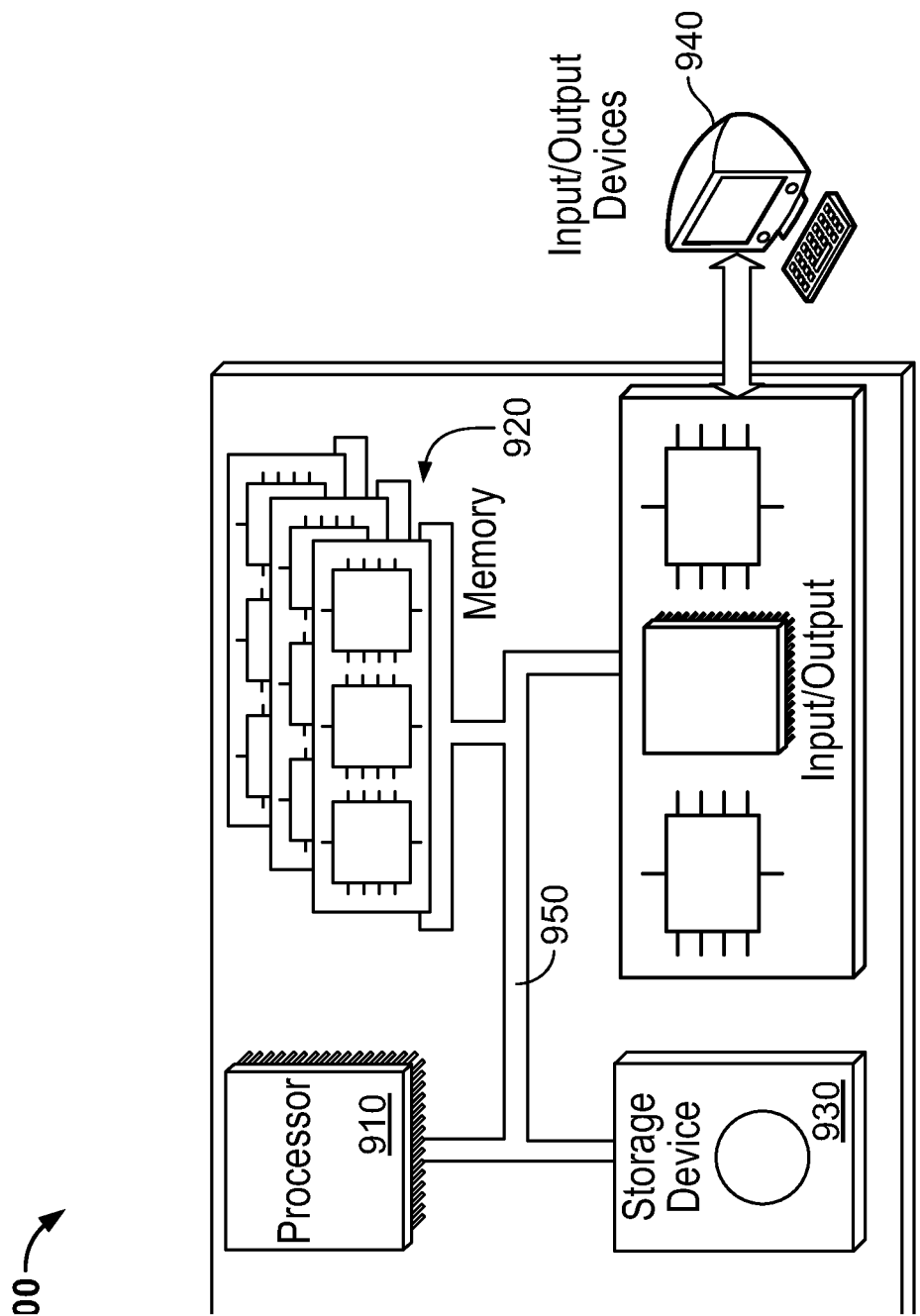
FIG. 9 is a schematic illustration of a controller or control system according to the present disclosure.

FIG. 9 is a schematic illustration of an example controller 900 (or control system) according to the present disclosure. For example, the controller 900 can be used for the operations described previously, for example as or as part of a gamma ray detection system as described herein. For example, the controller 900 may be communicably coupled with, or as a part of, a gamma ray pinhole camera or gamma ray image detector as described herein.

The controller 900 is intended to include various forms of digital computers, such as printed circuit boards (PCB), processors, digital circuitry, or otherwise. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 900 includes a processor 910, a memory 920, a storage device 930, and an input/output device 940. Each of the components 910, 920, 930, and 940 are interconnected using a system bus 950. The processor 910 is capable of processing instructions for execution within the controller 900. The processor may be designed using any of a number of architectures. For example, the processor 910 may be a CISC (Complex Instruction Set Computers) processor, a RISC (Reduced Instruction Set Computer) processor, or a MISC (Minimal Instruction Set Computer) processor.

In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the controller 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the controller 900. In one implementation, the storage device 930 is a computer-readable medium. In various different implementations, the storage device 930 may be a floppy disk device, a hard disk device, an optical disk device, a tape device, flash memory, a solid state device (SSD), or a combination thereof.

The input/output device 940 provides input/output operations for the controller 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A first example implementation according to the present disclosure includes a nuclear waste canister that includes a spherical or substantially spherical outer housing that defines an inner volume; and a storage space defined within the inner volume of the outer housing, the storage space configured to enclose a plurality of portions of the nuclear waste. The outer housing is configured to store nuclear waste in a human-unoccupiable directional drillhole In an aspect combinable with the first example implementation, the nuclear waste includes spent nuclear fuel.

In another aspect combinable with any of the previous aspects of the first example implementation, the portions of the nuclear waste include spent nuclear fuel pellets.

In another aspect combinable with any of the previous aspects of the first example implementation, the outer housing includes a corrosion resistant alloy.

In another aspect combinable with any of the previous aspects of the first example implementation, the corrosion resistant alloy includes CRA 625.

In another aspect combinable with any of the previous aspects of the first example implementation, the outer housing includes a first portion and a second portion.

In another aspect combinable with any of the previous aspects of the first example implementation, each of the first and second portions of the outer housing includes a hemispherical portion.

In another aspect combinable with any of the previous aspects of the first example implementation, herein the hemispherical portions are configured to weld together to form the outer housing.

In another aspect combinable with any of the previous aspects of the first example implementation, the first portion includes a semispherical portion that includes a hole and the second portion includes a lid sized to fit the hole.

In another aspect combinable with any of the previous aspects of the first example implementation, semispherical portion and the lid are configured to weld together to form the outer housing.

Another aspect combinable with any of the previous aspects of the first example implementation further includes a plurality of rods positioned in the storage space, each of the rods configured to hold a plurality of spent nuclear fuel pellets.

In another aspect combinable with any of the previous aspects of the first example implementation, each rod is made from a corrosion resistant material or a neutron absorbing material.

A second example implementation includes a method for containing nuclear waste that includes placing a plurality of portions of nuclear waste in a storage space of an inner volume of a spherical or substantially spherical outer housing of a nuclear waste canister; and sealing the nuclear waste canister to enclose the plurality of portions of nuclear waste in the inner volume.

An aspect combinable with the second example implementation further includes moving the sealed nuclear waste canister into a hazardous waste repository of a human-unoccupiable directional drillhole formed in a subterranean formation.

In another aspect combinable with any of the previous aspects of the second example implementation, the nuclear waste includes spent nuclear fuel.

In another aspect combinable with any of the previous aspects of the second example implementation, the portions of the nuclear waste include spent nuclear fuel pellets.

In another aspect combinable with any of the previous aspects of the second example implementation, the outer housing includes a corrosion resistant alloy.

In another aspect combinable with any of the previous aspects of the second example implementation, the corrosion resistant alloy includes CRA 625.

In another aspect combinable with any of the previous aspects of the second example implementation, the outer housing includes a first portion and a second portion.

In another aspect combinable with any of the previous aspects of the second example implementation, each of the first and second portions of the outer housing includes a hemispherical portion.

Another aspect combinable with any of the previous aspects of the second example implementation further includes welding the hemispherical portions together to form the outer housing.

In another aspect combinable with any of the previous aspects of the second example implementation, the first portion includes a semispherical portion that includes a hole and the second portion includes a lid sized to fit the hole.

Another aspect combinable with any of the previous aspects of the second example implementation further includes welding the semispherical portion and the lid together to form the outer housing.

Another aspect combinable with any of the previous aspects of the second example implementation further includes inserting a plurality of spent nuclear fuel pellets into a plurality of rods positioned in the storage space.

In another aspect combinable with any of the previous aspects of the second example implementation, each rod is made from a corrosion resistant material or a neutron absorbing material.

A third example implementation includes a nuclear waste storage system that includes a cylindrical nuclear waste container that defines an inner space; and a plurality of nuclear waste canisters according to any of the aspects of the first example implementation positioned in the inner space of the nuclear waste container.

In an aspect combinable with the third example implementation, the nuclear waste container includes radiation shielding at a first proximate end and a second distal end of the container.

A fourth example implementation includes a method for inspecting a weld of a nuclear waste canister that includes positioning a gamma ray image detector near a nuclear waste canister that encloses nuclear waste. The nuclear waste canister includes a housing that includes a volume in which the waste is enclosed and a cap connected to the housing with at least one weld to seal the nuclear waste in the nuclear waste canister. The method further includes receiving, at the gamma ray image detector, gamma rays from the nuclear waste that travel from the nuclear waste, through a hole in a gamma ray shield that is positioned in the volume to hit a scatterer positioned above the shield, scattered toward the weld, and through one or more voids in the weld; generating an image of the received gamma rays with the gamma ray image detector; and based on the generated image, determining an integrity of the at least one weld.

In an aspect combinable with the fourth example implementation, the nuclear waste includes spent nuclear fuel.

In an aspect combinable with any of the previous aspects of the fourth example implementation, the spent nuclear fuel includes at least one spent nuclear fuel assembly.

In an aspect combinable with any of the previous aspects of the fourth example implementation, the gamma ray image detector includes a pinhole camera.

In an aspect combinable with any of the previous aspects of the fourth example implementation, at least one of the housing, the cap, or a weld material includes a corrosion resistant alloy.

In an aspect combinable with any of the previous aspects of the fourth example implementation, each of the housing, the cap, and the weld material includes the corrosion resistant alloy.

In an aspect combinable with any of the previous aspects of the fourth example implementation, the corrosion resistant alloy includes CRA 625.

In an aspect combinable with any of the previous aspects of the fourth example implementation, the at least one weld includes a horizontal weld.

In an aspect combinable with any of the previous aspects of the fourth example implementation, the hole in the gamma ray shield is radially aligned with a centerline axis of the housing.

In an aspect combinable with any of the previous aspects of the fourth example implementation, the hole in the gamma ray shield and the scatterer are radially aligned with a centerline axis of the housing.

An aspect combinable with any of the previous aspects of the fourth example implementation further includes rotating at least one of the nuclear waste canister or the gamma ray image detector during the receiving, at the gamma ray image detector, of the gamma rays from the nuclear waste that travel through the one or more voids in the weld.

In an aspect combinable with any of the previous aspects of the fourth example implementation, the rotating includes rotating at least one of the nuclear waste canister or the gamma ray image detector for 360 degrees.

In an aspect combinable with any of the previous aspects of the fourth example implementation, the cap is spin welded to the housing.

A fifth example implementation includes a system for inspecting a weld of a nuclear waste canister that includes a nuclear waste canister and a gamma ray image detector system. The nuclear waste canister encloses nuclear waste and includes a housing that includes a volume configured to enclose the nuclear waste, a cap connected to the housing with at least one weld to seal the nuclear waste in the nuclear waste canister, a gamma ray shield that is positioned in the volume between the nuclear waste and the cap, and a scatterer positioned above the shield. The gamma ray image detector system is positionable adjacent the nuclear waste canister and configured to receive gamma rays from the nuclear waste that travel through a hole in the gamma ray shield to hit the scatterer to scatter toward the weld and travel through one or more voids in the weld, generate an image of the received gamma rays, and based on the generated image, determine an integrity of the at least one weld.

In an aspect combinable with the fifth example implementation, the nuclear waste includes spent nuclear fuel.

In an aspect combinable with any of the previous aspects of the fifth example implementation, the spent nuclear fuel includes at least one spent nuclear fuel assembly.

In an aspect combinable with any of the previous aspects of the fifth example implementation, wherein the gamma ray image detector includes a pinhole camera.

In an aspect combinable with any of the previous aspects of the fifth example implementation, at least one of the housing, the cap, or a weld material includes a corrosion resistant alloy.

In an aspect combinable with any of the previous aspects of the fifth example implementation, each of the housing, the cap, and the weld material includes the corrosion resistant alloy.

In an aspect combinable with any of the previous aspects of the fifth example implementation, the corrosion resistant alloy includes CRA 625.

In an aspect combinable with any of the previous aspects of the fifth example implementation, the at least one weld includes a horizontal weld.

In an aspect combinable with any of the previous aspects of the fifth example implementation, the hole in the gamma ray shield is radially aligned with a centerline axis of the housing.

In an aspect combinable with any of the previous aspects of the fifth example implementation, the hole in the gamma ray shield and the scatterer are radially aligned with a centerline axis of the housing.

In an aspect combinable with any of the previous aspects of the fifth example implementation, at least one of the nuclear waste canister or the gamma ray image detector is configured to rotate during the receiving, at the gamma ray image detector, of the gamma rays from the nuclear waste that travel through the one or more voids in the weld.

In an aspect combinable with any of the previous aspects of the fifth example implementation, the rotation includes 360 degrees.

In an aspect combinable with any of the previous aspects of the fifth example implementation, the cap is spin welded to the housing.

A sixth example implementation includes a method for inspecting a weld of a nuclear waste canister that includes positioning a gamma ray image detector near a nuclear waste canister that encloses nuclear waste. The nuclear waste canister includes a housing that includes a volume in which the nuclear waste and a gamma ray source material are enclosed and a top connected to the housing with at least one weld to seal the nuclear waste in the nuclear waste canister. The method further includes receiving, at the gamma ray image detector, gamma rays from the gamma ray source material that travel through one or more voids in the weld; generating an image of the received gamma rays with the gamma ray image detector; and based on the generated image, determining an integrity of the at least one weld.

In an aspect combinable with the sixth example implementation, the nuclear waste includes spent nuclear fuel.

In an aspect combinable with any of the previous aspects of the sixth example implementation, the spent nuclear fuel includes at least one spent nuclear fuel assembly.

In an aspect combinable with any of the previous aspects of the sixth example implementation, the gamma ray source material includes Americium-241.

In an aspect combinable with any of the previous aspects of the sixth example implementation, the gamma ray source material is positioned at a vertical location in the volume of the canister to vertically align with the at least one weld.

In an aspect combinable with any of the previous aspects of the sixth example implementation, the gamma ray source material is positioned at or near a radial centerline of the volume of the canister.

In an aspect combinable with any of the previous aspects of the sixth example implementation, each of the housing, the top, and the weld material includes the corrosion resistant alloy.

In an aspect combinable with any of the previous aspects of the sixth example implementation, the corrosion resistant alloy includes CRA 625.

In an aspect combinable with any of the previous aspects of the sixth example implementation, the at least one weld includes a horizontal weld.

In an aspect combinable with any of the previous aspects of the sixth example implementation, receiving the gamma rays includes receiving a plurality of gamma rays that emit from the gamma ray source material and scatter through the volume of the nuclear waste container and through one or more voids in the one or more welds toward the gamma ray image detector.

An aspect combinable with any of the previous aspects of the sixth example implementation further includes rotating at least one of the nuclear waste canister or the gamma ray image detector during the receiving, at the gamma ray image detector, of the gamma rays from the gamma ray source material that travel through the one or more voids in the weld.

In an aspect combinable with any of the previous aspects of the sixth example implementation, the rotating includes rotating at least one of the nuclear waste canister or the gamma ray image detector for 360 degrees.

In an aspect combinable with any of the previous aspects of the sixth example implementation, the nuclear waste canister further includes a gamma ray shield positioned in the volume and vertically between the nuclear waste and the gamma ray source material.

In an aspect combinable with any of the previous aspects of the sixth example implementation, the gamma ray shield is positioned vertically between the at least one weld and the nuclear waste.

A seventh example implementation includes a system for inspecting a weld of a nuclear waste canister that includes a nuclear waste canister that encloses nuclear waste and includes a housing that includes a volume configured to enclose the nuclear waste and a top connected to the housing with at least one weld to seal the nuclear waste in the nuclear waste canister. The system further includes a gamma ray source material positioned in the volume of the housing; and a gamma ray image detector system positionable adjacent the nuclear waste canister and configured to receive gamma rays from the gamma ray source material that travel through one or more voids in the weld, generate an image of the received gamma rays with the gamma ray image detector, and based on the generated image, determine an integrity of the at least one weld.

In an aspect combinable with the seventh example implementation, the nuclear waste includes spent nuclear fuel.

In an aspect combinable with any of the previous aspects of the seventh example implementation, the spent nuclear fuel includes at least one spent nuclear fuel assembly.

In an aspect combinable with any of the previous aspects of the seventh example implementation, the gamma ray source material includes Americium-241.

In an aspect combinable with any of the previous aspects of the seventh example implementation, the gamma ray source material is positioned at a vertical location in the volume of the canister to vertically align with the at least one weld.

In an aspect combinable with any of the previous aspects of the seventh example implementation, the gamma ray source material is positioned at or near a radial centerline of the volume of the canister.

In an aspect combinable with any of the previous aspects of the seventh example implementation, each of the housing, the top, and the weld material includes the corrosion resistant alloy.

In an aspect combinable with any of the previous aspects of the seventh example implementation, the corrosion resistant alloy includes CRA 625.

In an aspect combinable with any of the previous aspects of the seventh example implementation, the at least one weld includes a horizontal weld.

In an aspect combinable with any of the previous aspects of the seventh example implementation, a plurality of gamma rays emit from the gamma ray source material and scatter through the volume of the nuclear waste container and through one or more voids in the one or more welds toward the gamma ray image detector.

In an aspect combinable with any of the previous aspects of the seventh example implementation, at least one of the nuclear waste canister or the gamma ray image detector is rotated during the receipt, at the gamma ray image detector, of the gamma rays from the gamma ray source material that travel through the one or more voids in the weld.

In an aspect combinable with any of the previous aspects of the seventh example implementation, at least one of the nuclear waste canister or the gamma ray image detector is rotated for 360 degrees during the receipt, at the gamma ray image detector, of the gamma rays from the gamma ray source material that travel through the one or more voids in the weld.

In an aspect combinable with any of the previous aspects of the seventh example implementation, the nuclear waste canister further includes a gamma ray shield positioned in the volume and vertically between the nuclear waste and the gamma ray source material.

In an aspect combinable with any of the previous aspects of the seventh example implementation, the gamma ray shield is positioned vertically between the at least one weld and the nuclear waste.

An eighth example implementation includes a method of sealing a nuclear waste canister including inserting nuclear waste into an open volume of a housing of a nuclear waste canister; preparing at least one of an edge of an open end of the housing or an edge of a lid sized to fit on the open end of the housing; attaching the edge of the open end of the housing to the edge of the lid by spin welding the lid onto the housing; and enclosing the open volume of the housing to seal the nuclear waste within the nuclear waste canister.

An aspect combinable with the eighth example implementation further includes attaching a flywheel to the lid; and rotating the flywheel to spin weld the lid onto the housing.

In an aspect combinable with any of the previous aspects of the eighth example implementation, the flywheel is attached to a gamma ray shield that is part of or mounted on the lid.

An aspect combinable with any of the previous aspects of the eighth example implementation further includes oscillating at least one of the housing or the lid to spin weld the lid onto the housing.

In an aspect combinable with any of the previous aspects of the eighth example implementation, at least one of the lid or the housing includes a corrosion-resistant metallic alloy.

In an aspect combinable with any of the previous aspects of the eighth example implementation, the corrosion-resistant metallic alloy includes CRA 625.

In an aspect combinable with any of the previous aspects of the eighth example implementation, preparing at least one of the edge of the open end of the housing or the edge of the lid includes preparing both of the edge of the open end of the housing and the edge of the lid.

In an aspect combinable with any of the previous aspects of the eighth example implementation, preparing includes polishing or smoothing.

In an aspect combinable with any of the previous aspects of the eighth example implementation, the spin welding includes welding the lid to the housing without any filler or flux material.

In an aspect combinable with any of the previous aspects of the eighth example implementation, the nuclear waste includes spent nuclear fuel.

A ninth example implementation includes a system for sealing a nuclear waste canister that includes a nuclear waste canister and a spin welding system. The nuclear waste canister includes a housing that defines an open volume and a lid sized to fit on an open end of the housing. The open end of the housing includes an edge that mirrors an edge of the lid. The open volume of the housing is sized to enclose nuclear waste. The spin welding system is configured to attach the edge of the open end of the housing to the edge of the lid by spin welding the lid onto the housing to enclose the open volume of the housing to seal the nuclear waste within the nuclear waste canister.

An aspect combinable with the ninth example implementation further includes a flywheel attachable to the lid, where the spin welding system is configured to rotate the flywheel to spin weld the lid onto the housing.

In an aspect combinable with any of the previous aspects of the ninth example implementation, the flywheel is attached to a gamma ray shield that is part of or mounted on the lid.

In an aspect combinable with any of the previous aspects of the ninth example implementation, the spin welding system is configured to oscillate at least one of the housing or the lid to spin weld the lid onto the housing.

In an aspect combinable with any of the previous aspects of the ninth example implementation, at least one of the lid or the housing includes a corrosion-resistant metallic alloy.

In an aspect combinable with any of the previous aspects of the ninth example implementation, the corrosion-resistant metallic alloy includes CRA 625.

In an aspect combinable with any of the previous aspects of the ninth example implementation, at least one of the edge of the open end of the housing or the edge of the lid is prepared prior to attachment.

In an aspect combinable with any of the previous aspects of the ninth example implementation, the preparation includes polishing or smoothing.

In an aspect combinable with any of the previous aspects of the ninth example implementation, the spin welding system is configured to weld the lid to the housing without any filler or flux material.

In an aspect combinable with any of the previous aspects of the ninth example implementation, the nuclear waste includes spent nuclear fuel.

A tenth example implementation includes a method of sealing a nuclear waste canister that includes inserting nuclear waste into an open volume of a housing of a nuclear waste canister; positioning a sub-lid on top of an edge of an open end of the housing; depositing a liquid or semi-solid metal on top of at least one of the sub-lid or the edge of the open end of the housing; and sealing, with the liquid or semi-solid metal, the open volume of the housing to seal the nuclear waste within the nuclear waste canister.

In an aspect combinable with the tenth example implementation, at least one of the sub-lid, the liquid or semi-solid metal, or the housing includes a corrosion resistant metallic alloy.

In an aspect combinable with any of the previous aspects of the tenth example implementation, each of the sub-lid, the liquid or semi-solid metal, and the housing includes the corrosion resistant metallic alloy.

In an aspect combinable with any of the previous aspects of the tenth example implementation, the corrosion resistant metallic alloy includes Alloy 625.

In an aspect combinable with any of the previous aspects of the tenth example implementation, the nuclear waste includes spent nuclear fuel.

In an aspect combinable with any of the previous aspects of the tenth example implementation, each of the sub-lid and the edge of the open end of the housing is circular.

In an aspect combinable with any of the previous aspects of the tenth example implementation, a circumference of the sub-lid is greater than an inner circumference of the edge of the open end of the housing, and the circumference of the sub-lid is less than an outer circumference of the edge of the open end of the housing.

In an aspect combinable with any of the previous aspects of the tenth example implementation, depositing the liquid or semi-solid metal on top of at least one of the sub-lid or the edge of the open end of the housing includes depositing the liquid or semi-solid metal to cover the sub-lid and a portion of the edge of the open end of the housing that is exposed by the sub-lid.

An aspect combinable with any of the previous aspects of the tenth example implementation further includes depositing an amount of the liquid or semi-solid metal to form a lid of a particular thickness on the housing of the canister.

In an aspect combinable with any of the previous aspects of the tenth example implementation, depositing the liquid or semi-solid metal on top of at least one of the sub-lid or the edge of the open end of the housing includes three-dimensionally (3D) printing the liquid or semi-solid metal on top of at least one of the sub-lid or the edge of the open end of the housing.

An eleventh example implementation includes a system for sealing a nuclear waste canister that includes a nuclear waste canister including a housing that defines an open volume and a sub-lid sized to fit on an open end of the housing, the open end of the housing including an edge, the open volume of the housing sized to enclose nuclear waste; and a direct metal deposition system configured to deposit a liquid or semi-solid metal on top of at least one of the sub-lid or the edge of the open end of the housing and seal, with the liquid or semi-solid metal, the open volume of the housing to seal the nuclear waste within the nuclear waste canister.

In an aspect combinable with the eleventh example implementation, at least one of the sub-lid, the liquid or semi-solid metal, or the housing includes a corrosion resistant metallic alloy.

In an aspect combinable with any of the previous aspects of the eleventh example implementation, each of the sub-lid, the liquid or semi-solid metal, and the housing includes the corrosion resistant metallic alloy.

In an aspect combinable with any of the previous aspects of the eleventh example implementation, the corrosion resistant metallic alloy includes Alloy 625.

In an aspect combinable with any of the previous aspects of the eleventh example implementation, the nuclear waste includes spent nuclear fuel.

In an aspect combinable with any of the previous aspects of the eleventh example implementation, each of the sub-lid and the edge of the open end of the housing is circular.

In an aspect combinable with any of the previous aspects of the eleventh example implementation, a circumference of the sub-lid is greater than an inner circumference of the edge of the open end of the housing, and the circumference of the sub-lid is less than an outer circumference of the edge of the open end of the housing.

In an aspect combinable with any of the previous aspects of the eleventh example implementation, the direct metal deposition system is configured to deposit the liquid or semi-solid metal to cover the sub-lid and a portion of the edge of the open end of the housing that is exposed by the sub-lid.

In an aspect combinable with any of the previous aspects of the eleventh example implementation, the direct metal deposition system is configured to deposit an amount of the liquid or semi-solid metal to form a lid of a particular thickness on the housing of the canister.

In an aspect combinable with any of the previous aspects of the eleventh example implementation, the direct metal deposition system includes a three-dimensional (3D) printer.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method for inspecting a weld of a nuclear waste canister, comprising:
   positioning a gamma ray image detector near a nuclear waste canister that encloses nuclear waste, the nuclear waste canister comprising a housing that comprises a volume in which the waste is enclosed and a top connected to the housing with at least one weld to seal the nuclear waste in the nuclear waste canister;
   receiving, at the gamma ray image detector, gamma rays from the nuclear waste that travel through one or more voids in the weld;
   generating an image of the received gamma rays with the gamma ray image detector; and
   based on the generated image, determining an integrity of the at least one weld.

2. The method of claim 1, wherein the nuclear waste comprises spent nuclear fuel.

3. The method of claim 2, wherein the spent nuclear fuel comprises at least one spent nuclear fuel assembly.

4. The method of claim 1, wherein the gamma ray image detector comprises a pinhole camera or an Anger camera.

5. The method of claim 1, wherein at least one of the housing, the top, or a weld material comprises a corrosion resistant alloy.

6. The method of claim 5, wherein each of the housing, the top, and the weld material comprises the corrosion resistant alloy.

7. The method of claim 5, wherein the corrosion resistant alloy comprises CRA 625.

8. The method of claim 1, wherein the at least one weld comprises a horizontal weld.

9. The method of claim 1, wherein receiving the gamma rays comprises receiving a plurality of gamma rays that emit from the nuclear waste and scatter through the volume of the nuclear waste container and through one or more voids in the one or more welds toward the gamma ray image detector.

10. The method of claim 1, further comprising rotating at least one of the nuclear waste canister or the gamma ray image detector during the receiving, at the gamma ray image detector, of the gamma rays from the nuclear waste that travel through the one or more voids in the weld.

11. The method of claim 10, wherein the rotating comprises rotating at least one of the nuclear waste canister or the gamma ray image detector for 360 degrees.

12. The method of claim 1, wherein the at least one weld that connects the top to the housing comprises a seal formed with a direct material deposition system.

13. A system for inspecting a weld of a nuclear waste canister, comprising:
   a nuclear waste canister that encloses nuclear waste, the nuclear waste canister comprising a housing that comprises a volume configured to enclose the nuclear waste and a top connected to the housing with at least one weld to seal the nuclear waste in the nuclear waste canister; and
   a gamma ray image detector system positioned adjacent the nuclear waste canister and configured to perform operations comprising:
      receiving gamma rays from the nuclear waste that travel through one or more voids in the weld;
      generating an image of the received gamma rays with at least one gamma ray image detector; and
      based on the generated image, determining an integrity of the at least one weld.

14. The system of claim 13, wherein the nuclear waste comprises spent nuclear fuel.

15. The system of claim 14, wherein the spent nuclear fuel comprises at least one spent nuclear fuel assembly.

16. The system of claim 13, wherein the gamma ray image detector system comprises a pinhole camera or an Anger camera.

17. The system of claim 13, wherein at least one of the housing, the top, or a weld material comprises a corrosion resistant alloy.

18. The system of claim 17, wherein each of the housing, the top, and the weld material comprises the corrosion resistant alloy.

19. The system of claim 17, wherein the corrosion resistant alloy comprises CRA 625.

20. The system of claim 13, wherein the at least one weld comprises a horizontal weld.

21. The system of claim 13, wherein the gamma ray image detector system is configured to receive a plurality of gamma rays that emit from the nuclear waste and scatter through the volume of the nuclear waste container and through one or more voids in the one or more welds.

22. The system of claim 13, wherein at least one of the nuclear waste canister or the gamma ray image detector system is configured to rotate during operation of the gamma ray image detector system to receive the gamma rays from the nuclear waste that travel through the one or more voids in the weld.

23. The system of claim 22, wherein the at least one of the nuclear waste canister or the gamma ray image detector system is configured to rotate 360 degrees during operation of the gamma ray image detector system to receive the gamma rays from the nuclear waste that travel through the one or more voids in the weld.

24. The system of claim 13, wherein the at least one weld that connects the top to the housing comprises a seal formed with a direct material deposition system.

* * * * *